United States Patent [19]
Nakamaki et al.

[11] Patent Number: 6,099,924
[45] Date of Patent: Aug. 8, 2000

[54] LAMINATE AND CONTAINER MADE OF THE SAME

[75] Inventors: Kenichirou Nakamaki, Yokohama; Norimasa Maida, Kudamatsu; Kouji Suzuki, Yokohama; Yoshitsugu Maruhashi, Yokohama; Yoshiki Takesue, Yokohama; Kazuhiro Satoh, Yokohama; Sachiko Machii, Yokohama; Tetsuo Miyazawa, Ayase; Katsuhiro Imazu, Yokohama, all of Japan

[73] Assignee: Toyo Seikan Daisha, Ltd., Tokyo, Japan

[21] Appl. No.: 08/898,525

[22] Filed: Jul. 22, 1997

[30] Foreign Application Priority Data

| Jul. 22, 1996 | [JP] | Japan | 8-192567 |
| Aug. 6, 1996 | [JP] | Japan | 8-207031 |
| Aug. 29, 1996 | [JP] | Japan | 8-229136 |

[51] Int. Cl.[7] ............................. B32B 5/00; B32B 5/04; B32B 15/08; B65D 1/12
[52] U.S. Cl. ............. 428/35.8; 428/36.91; 428/220; 428/332; 428/458
[58] Field of Search ................ 428/35.7, 35.8, 428/35.9, 458, 457, 36.91, 36.92, 220, 332

[56] References Cited

U.S. PATENT DOCUMENTS

| 4,693,677 | 9/1987 | Shigemoto et al. | 425/376 |
| 5,000,991 | 3/1991 | Hayashi et al. | 428/36.5 |
| 5,523,135 | 6/1996 | Shiwaku et al. | 428/35.7 |
| 5,759,651 | 6/1998 | Machii et al. | 428/35.8 |
| 5,776,616 | 7/1998 | Kosuga et al. | 428/480 |

OTHER PUBLICATIONS

Merck Index, 10th Edition, Compound 7907, pp. 1155, 1983.

*Primary Examiner*—Ellis Robinson
*Assistant Examiner*—John J. Figueroa
*Attorney, Agent, or Firm*—Sughrue, Mion, Zinn, Macpeak & Seas, PLLC

[57] ABSTRACT

A laminate obtained by laminating a resin composed chiefly of a polyester on a base material, said resin layer having a melt viscosity ratio (R) defined by the following formula (1), $$R = \eta_{12.2}/\eta_{1216} \tag{1}$$

wherein $\eta_{12.2}$ is a melt viscosity at an extrusion temperature of the polyester at a shearing rate of 12.2 sec$^{-1}$, and $\eta_{1216}$ is a melt viscosity at an extrusion temperature of the polyester at a shearing rate of 1216 sec$^{-1}$, of not smaller than 2.0 at a melt extrusion temperature of the polyester, and having $\eta_{1216}$ of not smaller than 500 poises, and said resin layer being further quickly quenched after it is melt-extruded.

18 Claims, 13 Drawing Sheets

WHEN THE LAMINATING SPEED IS 100M/MIN.
○ ⋯STABLY EXTRUDED
△ ⋯SELVAGE DEVIATES
× ⋯RUNS IN A ZIGZAG MANNER
□ ⋯MOLTEN RESIN DRIPS
☆ ⋯EXCESS OF LOAD IS EXERTED ON THE MOTOR

WHEN THE LAMINATING SPEED IS 100M/MIN.
○ ⋯STABLY EXTRUDED
△ ⋯SELVAGE DEVIATES
X ⋯RUNS IN A ZIGZAG MANNER
□ ⋯MOLTEN RESIN DRIPS
☆ ⋯EXCESS OF LOAD IS EXERTED ON THE MOTOR

LAMINATE AND CONTAINER MADE OF THE SAME

BACKGROUND OF THE INVENTION

1. Field of the Invention

The present invention relates to a laminate comprising a substrate such as of a metal and a polyester layer, and to a seamless can formed by using this laminate. More specifically, the invention relates to a laminate featuring high productivity, having uniform and intimately adhered layer, and exhibiting excellent shock resistance (dent resistance) and excellent dent resistance (heat/dent resistance) after having received thermal hysteresis at high temperatures, and to a seamless can.

2. Prior Art

A side seamless can has heretofore been obtained by subjecting a metal blank such as aluminum plate, tin plate or tin-free steel plate to at least one stage of draw working between a drawing die and a punch to form a cup comprising a barrel without side seam and a bottom integrally connected to the barrel without forming seam and, then as required, subjecting the barrel to the ironing working between an ironing punch and a die to decrease the thickness of the container barrel. It has also been known already to decrease the thickness of the side wall relying upon the bend-elongation at the corner of curvature of the redrawing die instead of effecting the ironing working (Japanese Patent Publication No. 501442/1981).

As a method of applying an organic coating material onto a side seamless can, furthermore, there has been known a method of laminating a resin film on a metal blank prior to the forming in addition to a method of applying an organic coating material onto the widely used cans after the forming. According to Japanese Patent Publication No. 34580/1984, a polyester film derived from a terephthalic acid and a tetramethylene glycol is laminated on a metal blank. It has further been known to produce a redrawn can based on the bend-elongation, by using a metal plate coated, for example, with a vinyl organosol, epoxy, phenolics, polyester, acrylic resin, etc.

A variety of methods have also been proposed for producing polyester-coated metal plates. For example, Japanese Patent Publication No. 34580/1984 discloses a metal blank on which is laminated a polyester film derived from a terephthalic acid and a tetramethylene glycol, for producing the cans.

Japanese Laid-Open Patent Publication No. 4229/1993 discloses a film composed of a polyethylene terephthalate having a trace of biaxial orientation on the surface thereof, and Japanese Laid-Open Patent Publication No. 172556/1994 proposes a polyester film having a intrinsic viscosity [η] of not smaller than 0.75 that is to be laminated on a metal.

Furthermore, Japanese Laid-Open Patent Publication No. 101930/1991 discloses a coated metal plate for drawn cans, comprising a laminate of a metal plate, a polyester film layer composed chiefly of an ethylene terephthalate unit and, as required, an adhesive primer layer interposed between the metal plate and the polyester film, the polyester layer having an X-ray diffraction intensity as defined by the formula, $$Rx = IA/IB$$

where IA is an X-ray diffraction intensity on a diffraction plane having a spacing of about 0.34 nm (CuKα X-ray diffraction angle of 24° to 28°) in parallel with the surface of the polyester film, and IB is an X-ray diffraction intensity on a diffraction plane having a spacing of about 0.39 nm (CuKα X-ray diffraction angle of 21.5° to 24°) in parallel with the surface of the polyester film, of from 0.1 to 15, and an anisotropic index of in-plane orientation of crystals of smaller than 30. There has further been disclosed a thin draw-worked can obtained by subjecting the coated metal plate to the drawing and redrawing, and subjecting the side wall of the can barrel to the bend-elongation to decrease the thickness at the time of redraw working.

According to the above-mentioned prior art, a resin film may be applied to the metal blank of before being formed requiring neither the furnace for firing the coating nor the facility for treating exhaust gases of coating material like the ordinarily employed coating processing, giving such advantages that the air is not polluted and the can after formed needs not be coated with the coating material still leaving, however, a room for improvement from the standpoint of forming a film and extrusion-coating onto the metal base. When the laminate is used for producing cans, furthermore, there still is a room for improvement in regard to formability into cans, properties of the cans and, particularly, shock resistance (dent resistance), shock resistance after thermal hysteresis, corrosion resistance, wrap-seaming property and sealing property.

That is, in the general metal-resin laminate, it is widely accepted practice to extrude and apply the resin onto the metal base. If this method of extrusion coating can be adapted even to the polyester, then, it can be expected to decrease the work for forming films and for effecting the drawing and, hence, to decrease the cost therefor.

However, a metal-polyester laminate and, particularly, a laminate for forming seamless containers is subject to be put to heat treatments during the steps of production causing the undrawn or unoriented polyester to be thermally crystallized (whitening, formation of lamella), whereby the coating becomes brittle to impair the workability. If the polyester of the laminate is maintained in the molecularly oriented state, then, excessive thermal crystallization is not formed during the heat treatment. This is why the molecularly oriented polyester film is used for the laminate.

As a method of producing a laminate by extruding and laminating a thermoplastic resin onto a base material, furthermore, there has been known a so-called T-die method by using an extruder and a T-die. When it is attempted to laminate the polyester resin based on the T-die method, however, the flow loses stability in the extruder and in the die, and there takes place a so-called draw resonance phenomenon in which the selvage deviates in a zigzag manner due to lack of tension after the resin has come out from the T-die, making it difficult to obtain a uniform film thickness. Besides, both ends of the deviated selvage must be trimmed hindering the yield. These phenomena occurs particularly when the speed for taking up the resin is high making it very difficult to laminate the polyester resin at a high speed.

Moreover, the polyester resin loses viscosity as it is deteriorated with heat. In an extreme case, therefore, the polyester resin drops in lumps from the T-die.

Similar problem occurs in the stage of forming a film even when an undrawn cast film is used or a biaxially drawn film is used for forming the laminate.

A practical shock resistance that is required when the laminate is really used for producing canned products may be the so-called dent resistance. This is the property in that the coating stays intimately adhered or maintains a complete coverage even in case the canned products are dented as they fell or came into collision with each other. That is, in case the coating is peeled off or the pinholes or cracks are formed in the coating during the denting testing, the metal elutes out from such portions or leakage occurs through pitting, causing the contents to be no longer preserved.

Next, in the case of the cans for the canned products, the coating inevitably receives the effect of heat treatment. Namely, it is accepted practice to print the indication of contents on the outer surface of the can, and the polyester film is affected by the heat of firing the printing ink. In practically producing the cans, furthermore, the cans are often heated to relax internal stress and stabilize the resin coating, and the effect of heating upon the polyester is not negligible. The polyester tends to be thermally crystallized and deteriorated, i.e., tends to lose the molecular weight upon the heating, whereby the dent resistance decreases, adhesiveness to the metal base decreases, coating property decreases, and workability decreases such as necking workability, wrap-seam workability, etc.

SUMMARY OF THE INVENTION

In forming a resin layer comprising chiefly a polyester on a base material such as of a metal, therefore, it is an object of the present invention is to provide a laminate featuring uniform coating, complete coating, excellent adhesiveness and moldability and excellent productivity, and a seamless can made by using this laminate, eliminating the above-mentioned problems.

Another object of the present invention is to provide a metal-polyester laminate featuring markedly improved shock resistance and, particularly, dent resistance, without being brittled by crystallization and thermally deterioration despite of a high degree of draw working or ironing working or despite of the heat treatment during or after the step of production, maintaining excellent dent resistance, and to provide a seamless container made by using this laminate.

A further object of the present invention is to provide a polyester-metal laminate having markedly improved dent resistance after having received thermal hysteresis at high temperatures and a seamless container formed by using this laminate.

According to the present invention, there is provided a laminate obtained by laminating a resin composed chiefly of a polyester on a base material, said resin layer having a melt viscosity ratio (R) defined by the following formula (1), $$R = \eta_{12.2}/\eta_{1216} \quad (1)$$

wherein $\eta_{12.2}$ is a melt viscosity at an extrusion temperature of the polyester at a shearing rate of 12.2 sec$^{-1}$, and $\eta_{1216}$ is a melt viscosity at an extrusion temperature of the polyester at a shearing rate of 1216 sec$^{-1}$, of not smaller than 2.0 at a melt extrusion temperature of the polyester, and having $\eta_{1216}$ of not smaller than 500 poises, and said resin layer being further quickly quenched after it is melt-extruded.

In the above-mentioned laminate of the present invention, it is desired that:

1. The resin layer has a melt tension of from 0.2 to 1.5 grams at a temperature of the melt-extrusion;
2. The resin layer has a dieswell of from 1.3 to 2.0 at the temperature of the melt-extrusion; and
3. The resin layer has a degree of polydispersion (d) defined by the following formula (2), $$d = Mw/Mn \quad (2)$$

wherein Mw is a weight average molecular weight, and Mn is a number average molecular weight,
of not smaller than 2.5.

According to the present invention, there is further provided a laminate comprising a metal base and a resin layer composed chiefly of a polyester, wherein said resin layer comprises a polyester or a polyester composition containing (I) a polyethylene terephthalate segment, (II) a polyester segment derived from a butylene glycol and an aromatic dibasic acid, and (III) a polyester segment derived from a butylene glycol and an aliphatic dibasic acid at a eight ratio I:II:III of 30–80:8–63:2–42 with the total amount as 100 parts by weight, and further contains at least one kind of non-sulfur type antioxidant having a molecular weight of not smaller than 400 in an amount of from 0.01 to 1.5 parts by weight per 100 parts by weight of the polyester or the polyester composition.

According to the present invention, there is further provided a laminate comprising a metal base and a plurality of resin layers composed chiefly of a polyester, wherein the surface resin layer in said plurality of resin layers comprises a polyester composition having a glass transition point of not lower than 70° C., and the underlying resin layer in said plurality of resin layers comprises a polyester or a polyester composition containing (I) a polyethylene terephthalate segment, (II) a polyester segment derived from a butylene glycol and an aromatic dibasic acid, and (III) a polyester segment derived from a butylene glycol and an aliphatic dibasic acid at a weight ratio I:II:III of 30–80:8–63:2–42 with the total amount as 100 parts by weight, and further contains at least one kind of non-sulfur type antioxidant having a molecular weight of not smaller than 400 in an amount of from 0.01 to 1.5 parts by weight per 100 parts by weight of the polyester or the polyester composition.

It is desired that the polyester composition is a blend of a polyester composed chiefly of a polyethylene terephthalate segment (I), and a copolymerized polyester containing a polyester segment (II) and a polyester segment (III). In this case, it is particularly desired that the polyester composed chiefly of the polyethylene terephthalate segment (I) in the blend has an ester interchange ratio (E) as defined by the following formula (3), $$E = 100 \cdot [1 - \exp\{(Hu/R) \cdot (1/Tm0 - 1/Tm)\}] \quad (3)$$

wherein,
Hu: quantity of heat of fusion of crystalline polyester composed chiefly of an ethylene terephthalate unit, 9200 (J/mol),
R: gas constant, 8.314 (J/(mol·K)),
Tm: melting point (K) of the blend,
Tm0: melting point (K) of the crystalline polyester composed chiefly of the ethylene terephthalate unit,
of from 0.5 to 20%. And, it is desired that a intrinsic viscosity [η] of the blend is not smaller than 0.55 cc/g.

According to the present invention, there is obtained a container obtained by working the above-mentioned laminate, at least the inner surface thereof being coated with a polyester composition.

BRIEF DESCRIPTION OF THE DRAWINGS

FIG. 12 illustrates a container having a polyhedral wall with the quadrilateral as a constituent unit plane, wherein FIG. 12(A) is a plan view, FIG. 12(B) is a vertical sectional view, and FIG. 12(C) is a horizontal sectional view; and FIG. 13 illustrates a constituent unit plane of a polyhedral wall formed on the side surfaces of the container of FIG. 11, wherein FIG. 13(A) is a plan view, and FIGS. 13(B), 13(C) and 13(D) are vertical sectional views of the constituent unit planes having different radii of curvature at the dent portions.

DETAILED DESCRIPTION OF THE INVENTION

Figure 1:
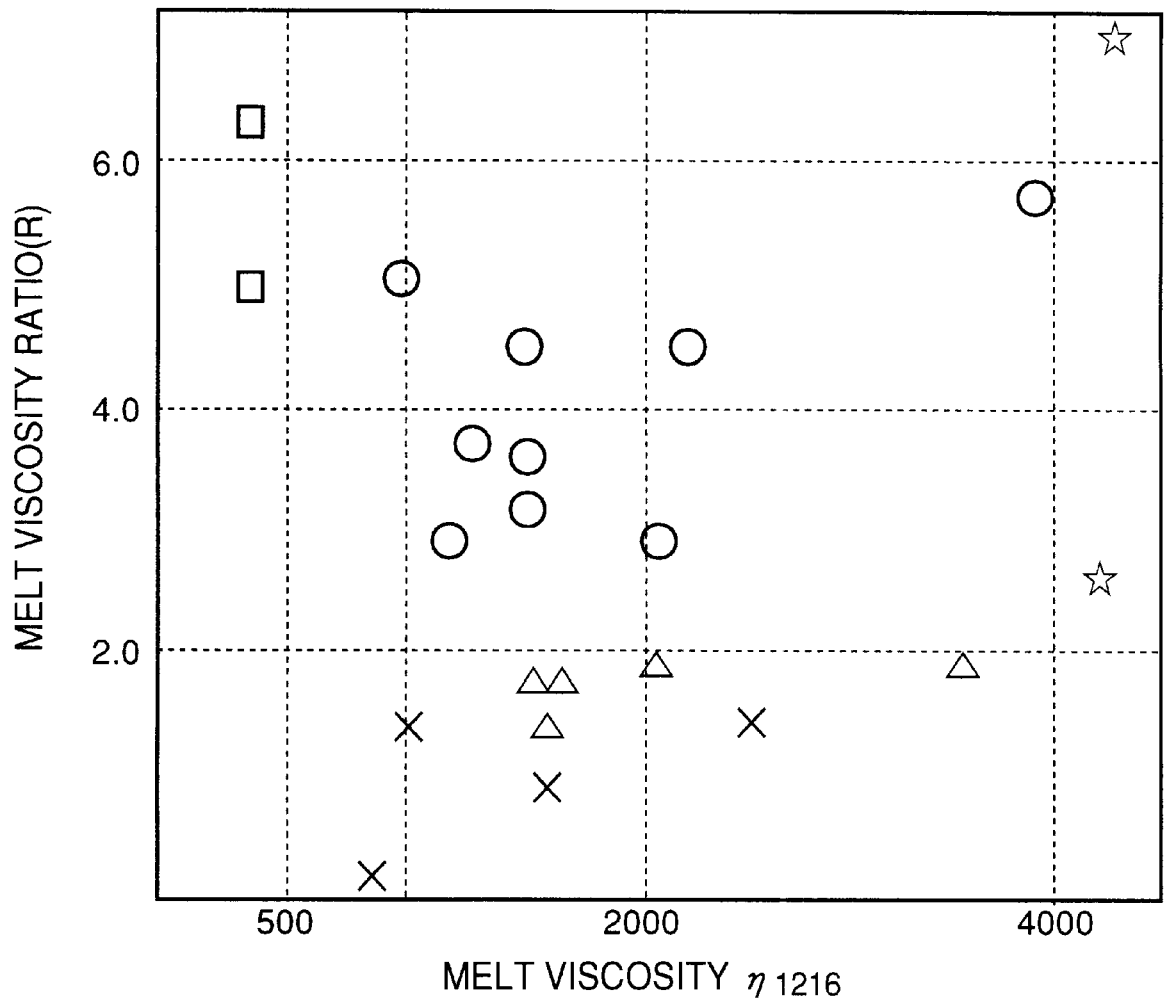
FIG. 1 is a graph plotting relationships to the draw resonance of various polyesters, wherein the ordinate represents the melt viscosity ratio (R) and the abscissa represents $\eta_{1216}$.

According to the present invention, the polyester is melt-extruded through a die and is laminated on a base material such as of a metal directly or after it is once formed into a film. The polyester used here has a melt viscosity ratio (R) represented by the above-mentioned formula (1) of not smaller than 2.0 and a melt viscosity $\eta_{1216}$ at a shearing rate 1216 $sec^{-1}$ of not smaller than 500 poises. This makes it possible to produce, at a speed as high as 100 m/min or more maintaining stability, a laminate having a uniform film thickness without defect in the film maintaining excellent adhesiveness to the base material, suppressing draw resonance phenomenon, and maintaining a high yield.

In the present invention, importance is given to the melt viscosity $\eta_{1216}$ at a shearing rate 1216 $sec^{-1}$. This is because, the polyester is melt-extruded in the extruder or in the dies at a high shearing rate, and the above-mentioned shearing rate is employed as a reference value for the high shearing rate. The melt viscosity ratio (R) in the above-mentioned formula (1) is a ratio of the melt viscosity at a high shearing rate 1216 $sec^{-1}$ to the melt viscosity at a low shearing rate 12.2 $sec^{-1}$ over a range of 100 times of the shearing rate. This ratio represents the non-Newtonian property of the molten polyester fluid. In the case of a Newtonian fluid, the melt viscosity ratio (R) is 1.0. As the deviation increases from the Newtonian fluid, however, the melt viscosity ratio (R) becomes larger than 1.

In order to suppress the draw resonance phenomenon, in general, it is desired to use a resin having stable fluidity and large melt tension. In the case of the polyester, however, an increase in the melt tension is accompanied by a sharp increase in the viscosity. In an ordinary extruder, therefore, it becomes difficult to extrude the polyester; i.e., extrusion at high speed becomes difficult. When the extrusion temperature is raised to effect the extrusion, the draw resonance phenomenon takes place due to a decrease in the viscosity of the resin and a decrease in the tension, and the molten resin drips from the die, making it no longer possible to effect the lamination at high speeds.

According to the present invention, on the other hand, the molten polyester maintains a low viscosity in the extruder having a high shearing rate owing to the above-mentioned melt viscosity characteristics; i.e., the polyester is extruded with a small load, no shearing is applied after the polyester is released from the die, the viscosity increases and the melt tension increases. Therefore, the resin does not drip and the draw resonance phenomenon is suppressed.

In the flow path and in the die, the molten polyester exhibits non-Newtonian flow characteristics. Therefore, the flow seldom loses stability and, in this respect, the draw resonance phenomenon is suppressed.

The melt viscosity ratio (R) of polyester used for the production of a metal-polyester laminate assumes a value 1 or a value close thereto. When such a polyester is laminated on the base material by the extrusion coating, selvage deviates as described in Comparative Examples appearing later. The selvage deviates conspicuously with an increase in the speed, imposing limitation on the high-speed extrusion.

According to the present invention, on the other hand, the melt viscosity ratio (R) and $\eta_{1216}$ are set to lie within the above-mentioned ranges. As described in the Examples appearing later, therefore, the lamination is accomplished at a high speed of not smaller than 100 m/min while completely preventing the deviation of selvage and dropping in lumps.

FIG. 1 is a graph plotting relationships to the draw resonance of various polyesters, wherein the ordinate represents the melt viscosity ratio (R) and the abscissa represents $\eta_{1216}$, from which it will be understood that the melt viscosity characteristics defined in the present invention are important for preventing the draw resonance.

In the polyester used in the present invention, it is necessary that the melt viscosity ($\eta_{1216}$) at the shearing rate 1216 $sec^{-1}$ is not smaller than 500 poises. When the melt viscosity is smaller than this value, the molten resin drips from the dies, and the film is not formed.

Though the upper limit varies depending upon the performance of the extruder, it is usually desired that $\eta_{1216}$ is not larger than 4000 poises so that excess of load will not be exerted on the extruder and that occurrence of melt fracture is prevented.

It is necessary that the melt viscosity ratio (R) is not smaller than 2.0.

It is desired that the resin layer has a melt tension of from 0.2 to 1.5 grams at a temperature of the melt-extrusion. When the melt tension is smaller than the above-mentioned range, the draw resonance (selvage deviation) tends to occur. When the melt tension is larger than the above-mentioned range, on the other hand, the film tends to be cut under high-speed conditions.

It is further desired that the resin layer has a dieswell of from 1.3 to 2.0 at a temperature of the melt-extrusion. When the dieswell is smaller than the above-mentioned range, the draw-resonance (selvage deviation) tends to occur though it may vary depending upon the melt tension. When the dieswell is larger than the above-mentioned range, on the other hand, the film tends to be cut under high-speed conditions.

It is further desired that the resin layer has a degree of polydispersion (d) as defined by the following formula (2), $$d = Mw/Mn \qquad (2)$$

wherein Mw is a weight average molecular weight, and
Mn is a number average molecular weight,
of not smaller than 2.5. When the degree of polydispersion (d) lies within the above-mentioned range, the polyester is stably extruded.

According to the present invention, the draw resonance phenomenon is eliminated at the time of forming the film or laminating the film. Therefore, the film having an increased width can be used maintaining good yield and featuring excellent productivity at the time of forming or laminating the film. Besides, the necking is small at the time of extrusion, and the film needs be trimmed over a small width; i.e., the film is utilized over an increased width contributing to increasing the yield and, further, exhibiting excellent flatness. According to the present invention; there is formed a polyester layer featuring uniform and perfect coating. The polyester layer of the laminate of the present invention excellently adheres to the base material such as of a metal and can be excellently molded into a container, etc.

According to the present invention as described above, it is important to melt-extrude a polyester or a polyester composition having particular melt viscosity characteristics and, at the same time, to quickly quench the extruded product. That is, upon quickly quenching the resin after extruded, formation of coarse crystals is suppressed, and the laminate is excellently molded into containers while the film is being biaxially drawn.

According to the present invention, a feature resides in that the difference between the density of the polyester layer of the laminate after extruded and the amorphous density is not larger than 0.05.

Here, the relationship of the density is expressed by the following formula, $$\rho - \rho_a \leq 0.05$$

wherein $\rho$ is a density of the polyester layer measured by the density-gradient tube method, and $\rho_A$ is a density of an amorphous sample prepared by holding the above polyester layer at a temperature higher than its melting point by 30° C. for 3 minutes and quenching it in the liquid nitrogen.

In the laminate of the present invention, the density of the polyester layer is limited to lie within the above-mentioned range. Therefore, its structure is nearly amorphous, exhibits improved adhesion to the base material such as of a metal, and contributes to enhancing the workability such as drawing or draw-ironing.

A container having excellent workability, shock resistance (dent resistance), corrosion resistance and heat resistance is obtained by subjecting the laminate of the present invention to the drawing, draw-ironing, adhesion or barrel-formation by welding.

That is, the polyester layer on the side wall (barrel) of the seamless container formed by drawing or draw-ironing, is monoaxially oriented in the direction of axis of the container and exhibits excellently oriented crystalline property, providing excellent shock resistance and barrier property against corrosive components.

In the present invention, it is desired to use, as a polyester to be laminated on the metal base, a polyester or a polyester composition containing (I) a polyethylene terephthalate segment, (II) a polyester segment derived from a butylene glycol and an aromatic dibasic acid, and (III) a polyester segment derived from a butylene glycol and an aliphatic dibasic acid at a weight ratio I:II:III of 30–80:8–63:2–42 with the total amount as 100 parts by weight. This makes it possible to impart excellent workability, shock resistance (dent resistance), corrosion resistance and heat resistance to the laminate. These properties are very important for producing seamless cans by subjecting the metal base-polyester laminate to the draw-redraw working or to the draw-ironing working.

In the polyester used in the present invention, the ethylene terephthalate segment (I) imparts mechanical strength, rigidity and heat resistance to the coating that is formed, and the polyester segments (II) and (III) reduce the glass transition point and quicken the rate of crystallization of the polyester coating, form fine crystals, improve workability of the polyester layer, and further improve dent resistance suited for the cans. By using these segments in combination, therefore, the shock resistance can be improved without decreasing the heat resistance.

That is, by simultaneously incorporating the polyester segment (II) and the polyester segment (III), the exposed metal after the denting test canbe markedly suppressed.

It is important that the polyester or the polyester composition of the present invention has a composition of the above-mentioned weight ratios. When the amount of the polyester segment (I) is larger than 80 parts by weight, the shock resistance of the polyester composition tends to decrease compared to that of when its amount lies within the range of the present invention. When the amount of the polyester (I) is smaller than 30 parts by weight, the heat resistance of the polyester composition tends to decrease compared to that of when its amount lies within the above-mentioned range of the present invention. Besides, the film tends to adhere to the tools arousing a problem from the standpoint of molding.

When the amount of the polyester segment (II) derived from the butylene glycol and the aromatic dibasic acid is larger than 63 parts by weight or when the amount of the polyester segment (III) derived from the butylene glycol and the aliphatic dibasic acid is larger than 42 parts by weight, the shock resistance tends to decrease compared with that of the case of the present invention. When a seamless can is produced, in particular, exposure of the metal (ERV) increases when the can has received a shock. When the amount of the polyester segment (II) is smaller than 8 parts by weight or when the amount of the polyester segment (III) is smaller than 2 parts by weight, the shock resistance decreases compared to that of the case of the present invention. When a seamless can is produced, in particular, the exposure of metal (ERV) increases when the can has received a shock. Concerning the shock resistance, there are optimum ranges for the amounts of the polyester segments (II) and (III).

In the present invention, it is particularly desired from the standpoint of heat resistance that the polyester composition is a blend of a polyester composed chiefly of the (I) ethylene terephthalate segment, and a copolymerized polyester containing the polyester segment (II) and the polyester segment (III). When these three components exist in the copolymerized polyester, its melting point tends to decrease despite the component ratio remains the same. By using the above-mentioned blend, however, the coating exhibits increased heat resistance.

In the present invention, it is desired that the component (I) in the above-mentioned blend, i.e., the ethylene terephthalate type crystalline polyester has an ester interchange ratio as represented by the above-mentioned formula (3) of from 0.5 to 20%.

The above-mentioned formula (3) for finding the ester interchange ratio is based on a generally known Flory's formula; i.e., the ester interchange ratio is found based on a predetermined relationship between the degree of ester interchange reaction in the blend and a drop in the melting point of the crystalline polyester (I) composed chiefly of ethylene terephthalate. That is, when the melting point of the polyester (I) is not at all dropping, the value of $1/Tm0-1/Tm$ on the left side of the formula (3) becomes 0, and the ester interchange ratio E becomes 0%. As the degree of drop of the melting point increases, $1/Tm0-1/Tm$ assumes a negative value and its absolute value increases; i.e., the ester interchange ratio E increases.

According to a preferred embodiment of the present invention, it is important that the ester interchange ratio is from 0.5 to 20% from the standpoint of corrosion resistance after having received a shock. That is, when the ester interchange ratio is smaller than 0.5%, the two components are not blended to a sufficient degree, and a film having satisfactory properties is not obtained. When the ester interchange ratio is larger than 20%, on the other hand, formation of a resin film, workability of the laminate, thermal resistance of the coating and properties of the molded container are adversely affected.

That is, when the ester interchange ratio is too high during the melt-extrusion of the polyester, the necking increases while the film is being formed, and the width of the resin film tends to decrease relative to the width of the T-die. Furthermore, an increase in the necking results in the decrease not only in the total width of the film but also in the width of a portion having a flat thickness that can be utilized as a product.

When the ester interchange ratio is too high even in the state of being laminated on the metal, furthermore, the workability of the laminate is adversely affected. Even in the form of a container, dent resistance greatly decreases, i.e., corrosion resistance greatly decreases after having received a shock.

The reason is considered to be as described below. The blend has a sea-island two-phase structure. In the present invention, the sea-island two-phase structure corresponds to the phase of the polyester (I) component consist mainly of polyethylene terephthalate and the phase of the polyester (II) component and the polyester (III) component derived from butylene glycol and aromatic acid or aliphatic acid. The polyester (I) component contributes to heat-resistance. The polyester (II) component and the polyester (III) component make glass transition point of coating decrease and make crystallization velocity fast, to improve shock resistance after heat-treating.

When ester interchange ratio excesses over 20%, it is considered that the heat-resistance of (I) component is decreased, and since the effect that the glass transition point of (II) component and (III) component is decreased and the effect that crystallization velocity is fasten are spoiled, the shock resistance is decreased. On the other hand, in the coating layer of the blend of which ester interchange ratio is within the above range, heat crystallization is suppressedl, cracks of film at the time when being shocked is prevented and excellent corrosion resistance is maintained.

According to the present invention, it is desired to contain a non-sulfur type antioxidant having a molecular weight of not smaller than 400 in an amount of from 0.01 to 1.5 parts by weight per 100 parts by weight of the above-mentioned polyester or the polyester composition. This makes it possible to markedly increase the dent resistance after the heat treatment at a high temperature.

That is, in a seamless can formed by drawing the metal-polyester laminate, strain remains in the layer of polyester. From the standpoint of durability and resistance against the heat and water, therefore, it is desired to remove the distortion by the heat treatment at a high temperature. A particular polyester or polyester composition used in the present invention by itself exhibits excellent dent resistance. When subjected to the heat treatment at, for example, 240° C. for 3 minutes, however, a current (scale of metal exposure) becomes as great as several tens of milliamperes after the denting testing. This is due to that the polyester is thermally decomposed to a conspicuous degree.

An antioxidant has generally been blended to prevent thermal decomposition of the resin. When a 2,6-di-t-butyl-p-cresol (BHT) which is the most popular antioxidant is blended, however, the thermal decomposition is not prevented during the thermal processing, and a current still remains on a high level after the denting testing. This is due to the fact that the BHT has a small molecular weight and evaporates much under the melt-drawing conditions of the polyester where the temperature is relatively high, and a sufficient degree of antioxidizing effect is not obtained during the heat treatment.

On the other hand, when the non-sulfur type antioxidant having a molecular weight of not smaller than 400 is selected and is blended in the polyester or the polyester composition, the decomposition is completely prevented during the heat treatment, and the exposed metal can be markedly suppressed after the denting testing compared to that of when the above antioxidant is not added. The antioxidant to be used is limited to the one of the non-sulfur type. This is because the antioxidant of the sulfur type causes the polyester composition to which it is added to be colored or to produce offensive odor.

In the present invention, it is important that the antioxidant is used in a limited amount of from 0.01 to 1.5 parts by weight. When the amount is smaller than the above-mentioned range, predetermined effect is not obtained. When the amount is larger than the above-mentioned range, on the other hand, the polyester is gelled and makes the surface of the laminate coarse so that, making it difficult to form a seamless can.

In the laminate and seamless container of the present invention, the polyester or the polyester composition blended with an antioxidant and containing the polyester segments (I), (II) and (III) should be provided on at least the inside of the can where corrosion resistance becomes a problem. This may be provided in the form of a single layer or a plurality of layers. In the latter case, the polyester layer blended with an antioxidant is formed as an underlying resin layer and on which is formed, as a surface resin layer, an ethylene terephthalate type polyester having a glass transition point not lower than 70° C. from the overall point of view such as workability, corrosion resistance, shock resistance and flavor retaining property.

According to the present invention, the layer composed chiefly of the polyester may be provided on the metal base by extrusion-coating, or may be thermally adhered on the metal base in the form of a biaxially drawn film. In the former case, the polyester is formed into a film and is directly laminated without being biaxially drawn. Even in this case, the laminate can be worked into a seamless can to a sufficient degree to exhibit the above-mentioned properties. According to the former case, therefore, seamless cans having enhanced properties are cheaply provided omitting many steps, maintaining high productivity, and saving cost for the facilities. In the latter case, the degree of thermal decomposition can be decreased through the step of forming the film and the step of lamination, and enhanced shock resistance and corrosion resistance are accomplished on the bottom of the can owing to the biaxially oriented polyester.

Polyester

The polyester layer used in the present invention is composed of a polyester or a polyester composition having a melt viscosity ratio (R) as defined by the above-mentioned formula (1) of not smaller than 2.0 and having $\eta_{1216}$ of not smaller than 500 poises and, particularly, from 500 to 4000 poises. In this specification, the polyester includes not only a homopolyester but also a copolymerized polyester. It is further desired that the polyester resin layer has a melt tension of from 0.2 to 1.5 grams and a dieswell of from 1.3 to 2.0 at a temperature of the melt-extrusion, and has a degree of polydispersion (d) as defined by the above-mentioned formula (2) of not smaller than 2.5.

It is desired that the polyester or the polyester composition has an intrinsic viscosity of not smaller than 0.55 cc/g from the standpoint of properties of the coated layer and the melt-extrusion characteristics, and has a melting point (Tm) of from 160 to 270° C. and, particularly, from 200 to 250° C. from the standpoint of heat resistance, workability and melt-extrusion characteristics.

Examples of the acid component from which the polyester is derived include dibasic aromatic dicarboxylic acids such as terephthalic acid, isophthalic acid, orthophthalic acid, p-β-oxyethoxybenzoic acid, naphthalene-2,6-dicarboxylic acid, diphenoxyethane-4,4'-dicarboxylic acid and 5-sodiumsulfoisophthalic acid; alicyclic dicarboxylic acids such as hexahydroterephthalic acid and cyclohexane diacetic acid; aliphatic dicarboxylic acid such as adipic acid, sebacic acid and dimeric acid; and polybasic acids such as trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid and biphenyl-3,4,3',4'-tetracarboxylic acid. They may be used alone or in a combination of two or more kinds.

Examples of the alcohol component from which the polyester is derived include diols such as ethylene glycol, propylene glycol, 1,4-butane diol, neopentyl glycol, 1,6-hexylene glycol, diethylene glycol, triethylene glycol and cyclohexane dimethanol; and polyhydric alcohols such as pentaerythritol, glycerol, trimethylolpropane, 1,2,6-hexanetriol, sorbitol, 1,1,4,4-tetrakis(hydroxymethyl) cyclohexane. They may be used alone or in a combination of two or more kinds.

A suitable polyester having the above-mentioned melt viscosity characteristics may be the one having a trifunctional or higher functional component introduced into the main polyester chain to form a branched chain or a crosslinked chain. Concrete examples include (a) a dibasic acid composed chiefly of an aromatic dicarboxylic acid such as terephthalic acid, (b) a diol composed chiefly of an ethylene glycol and/or a butylene glycol, and (c) a polyester or a polyester composition derived from at least one kind of branched or crosslinked component selected from the group consisting of a trifunctional or a higher functional polybasic acid and a polyhydric alcohol. Examples of the trifunctional or higher functional polybasic acid and polyhydric alcohol are as described above.

It is desired that the trifunctional component of trifunctional or higher functional polybasic acid and polyhydric alcohol bisphenol is contained in an amount of from 0.05 to 3.0 mol % and, preferably, from 0.1 to 3.0 mol % per the polyester or per the whole polyester. When the content is smaller than the above-mentioned range, it becomes difficult to obtain the above-mentioned melt viscosity characteristics. When the content is larger than the above-mentioned range, the polyester is gelled, and the melt-extrusion characteristics are deteriorated and the coated layer loses mechanical properties.

The polyester or the polyester composition preferably used in the present invention contains (I) the polyethylene terephthalate segment, (II) the polyester segment derived from the butylene glycol and the aromatic dibasic acid, and (III) the polyester segment derived from the butylene glycol and the aliphatic dibasic acid at a weight ratio of I:II:III= 30–80:8–63:2–42 with the total amount as 100 parts by weight.

In this specification, the segment has a meaning that is usually used, i.e., stands for a minimum unit in a high molecular chain that is used for statistically expressing the characteristics of the chain-like high molecules. It was mentioned already that the above-mentioned polyester segments exhibit their specific properties. These polyester segments need be contained in the polyester or in the polyester composition statistically at the above-mentioned composition ratio, and there is no particular limitation on the state of their presence. For example, they may be in the form of a blend of the polyesters or in the form of a copolymerized polyester.

In the present invention, however, it is desired to use a blend of a polyester (A) composed chiefly of (I) the ethylene terephthalate segment and a copolymerized polyester (B) which contains (II) the polyester segment and (III) the polyester segment. This will now be described in detail, to which only, however, the invention is in no way limited.

It is desired that the ethylene terephthalate type crystalline polyester (A) used as one component is a crystalline polyester in which most of, i.e., not smaller than 80 mol % of the ester recurring units are occupied by the ethylene terephthalate units. The homopolyethylene terephthalate is desired from the standpoint of heat resistance but it is also allowable to use a copolymerized polyester containing small amounts of ester units other than the ethylene terephthalate unit.

As the acid component other than the terephthalic acid, there can be preferably used at least one kind of polybasic acid selected from the group consisting of isophthalic acid, orthophthalic acid, p-β-oxyethoxybenzoic acid, naphthalene 2,6-dicarboxylic acid, diphenoxyethane-4,4'-dicarboxylic acid, 5-sodiumsulfoisophthalic acid, hexahydroterephthalic acid, adipic acid, sebacic acid, dimeric acid, trimellitic acid and pyromellitic acid. A polyester containing isophthalic acid or naphthalene 2,6-dicarboxylic acid as a copolymerizable component exhibits excellent properties for preserving the contents and for retaining flavor of the contents.

It is desired that the diol component is chiefly composed of an ethylene glycol. It is, however, also allowable to contain one or two or more diol components such as propylene glycol, 1,4-butane diol, diethylene glycol, 1,6-hexylene glycol, pentaerythritol, dipentaerythritol, cyclohexane dimethanol and ethylene oxide adduct of bisphenol A within a range in which the essentials of the present invention are not impaired.

The ethylene terephthalate type crystalline polyester (A) should have a molecular weight over a range for forming a film, and should have a limiting viscosity [η] of from 0.5 to 1.5 as measured by using, as a solvent, a phenol/tetrachloroethane mixture solvent.

It is desired that the polyester (A) has a melting point (Tm) over a range of from 200 to 280° C., and a glass transition point (Tg) over a range of from 20 to 90° C.

The copolymerized polyester (B) used as another component in the present invention is the one containing (II) the ester unit derived from the butylene glycol and the aromatic dibasic acid and (III) the ester unit derived from the butylene glycol and the aliphatic dibasic acid at the above-mentioned ratio.

Examples of the aromatic dibasic acid constituting the ester unit (II) include terephthalic acid, isophthalic acid, orthophthalic acid, p-β-oxyethoxybenzoic acid, naphthalene 2,6-dicarboxylic acid, diphenoxyethane-4,4'-dicarboxylic acid, 5-sodiumsulfoisophthalic acid. Among them, however, a terephthalic acid is preferably used.

Examples of the aliphatic dibasic acid component constituting the ester unit (III) includes succinic acid, azelaic acid, adipic acid, pimelic acid, suberic acid, sebacic acid, dodecanoic diacid, tetradecanoic diacid and dimeric acid. It is, however, desired to use a long-chain aliphatic dibasic acid from the standpoint of greatly lowering Tg and, particularly, to use the adipic acid from the standpoint of production on an industrial scale.

It is desired that the acid component which constructs ester unit (II) or ester unit (III) is composed of only dibasic acid. However, multi basic acid having not smaller than two ofd acid groups may be comprised within the purpose of the present invention.

It is desired that the diol component is composed of butylene glycol only but may contain one or two or more kinds of other diol components than the butylene glycol, such as ethylene glycol, propylene glycol, diethylene glycol, 1,6-hexylene glycol, cyclohexane dimethanol and ethylene oxide adduct of bisphenol A within a range in which the essentials of the present invention are not impaired.

It is important that the copolymerized polyester (B) contains the aromatic ester unit (II) and the aliphatic ester unit (III) at the above-mentioned ratio. When the content of the aliphatic ester unit is smaller than the above-mentioned range, the shock resistance (dent resistance) is not improved to a sufficient degree. When the content of the aliphatic ester unit is larger than the above-mentioned range, on the other hand, the layer loses shock resistance and heat resistance, workability and barrier property against the corrosive components.

The copolymerized polyester (B), too, should have a molecular weight over a range for forming a film, and should have a limiting viscosity [η] of from 0.5 to 2.0 as measured by using, as a solvent, a phenol/tetrachloroethane mixture solvent. It is further desired that the copolymerized polyester (B) has a melting point (Tm) of from 120 to 230° C., and a glass transition point (Tg) of from −30 to 30° C.

In the present invention, the ethylene terephthalate type polyester (A) and the above-mentioned particular copolymerized polyester (B) are used being blended at the above-mentioned ratio. The mixing may be either the dry-mixing or the melt-blending.

When subjected to the differential thermal analysis, the polyester composition used in the present invention which is a blend of the ethylene terephthalate type polyester (A) and the copolymerized polyester (B), exhibits a melting point ($Tm_1$) specific to the ethylene terephthalate type polyester (A) as well as a melting point ($Tm_2$) specific to the copolymerized polyester (B). The heights of the peaks vary depending upon the blending ratio of the two components. This fact indicates that even in a homogeneous composition, the ethylene terephthalate type polyester (A) and the copolymerized polyester (B) are present mainly as independent phases.

However, in the polyester composition, under the after-mentioned blending condition, the ester interchange reaction progresses to cause the drop of melt point of ethylene terephthalate polyester (A). It is desired that ester interchange ratio defined by the above-mentioned formula (3) containing melting point (Tm) of ethylene terephthalate polyester in the blend and melting point (Tm0) of ethylene terephthalate polyester before blending is within the range of 0.5 to 20%.

In the blend of the crystalline polyester resin (A) composed chiefly of the ethylene terephthalate and a particular copolymerized polyester resin (B), the ester interchange ratio is controlled to lie within the above-mentioned range by a method according to which the resin chips are blended and are kneaded while controlling the resin temperature, reaction time and humidity to thereby control the ester interchange ratio in a step preceding the extruder, or by a method according to which the starting material chips are directly thrown into the extruder, and the resin temperature and the residence time are controlled in the extruder. In either method, however, the temperature and time for kneading serve as very important parameters for the ester interchange reaction. The polyester resin is kneaded usually at a temperature of 240 to 280° C. When the temperature is high, the ester interchange reaction is promoted accompanied, however, by the pyrolysis, resulting eventually in a decrease in the molecular weight. The longer the kneading time, the higher the ester interchange ratio.

As for the mixing or kneading operation, the dry mixing is effected by using a blender or the Henschel's mixer and, then, the melt-kneading is effected by using a kneader, a monoaxial or a biaxial extrusion-type melt-kneading machine or a kneading machine for an injector.

Antioxidant

The antioxidant used in the present invention is the one having a molecular weight of not smaller than 400. Though not particularly limited thereto only, examples of the high-molecular phenolic antioxidant include:

tetrakis[methylene-3(3',5'-di-t-butyl-4'-hydroxyphenyl) propionate] methane (molecular weight, 1177.7), 1,1,3-tris(2-methyl-4-hydroxy-5-t-butylphenyl) butane (molecular weight 544.8), 1,3,5-trimethyl-2,4,6-tris(3,5-di-t-butyl-4-hydroxybenzyl) benzene (molecular weight, 775.2), bis[3,3'-bis-(4'-hydroxy-3'-t-butylphenyl) butyric acid] glycol ester (molecular weight, 794.4), 1,3,5-tris(3,5'-di-t-butyl-4'-hydroxybenzyl)-s-triazine 2,4,6-(1H,3H,5H) trione (molecular weight, 783.0), triethylene glycol-bis[3-(3-t-butyl-5-methyl-4-hydroxyphenyl) propionate] (molecular weight, 586.8), and 1,6-hexanediol-bis[3-(3,5-di-t-butyl-4-hydroxyphenyl) propionate] (molecular weight, 638.9).

Among them, it is preferred to use the tetrakis{methylene-3(3',5'-di-t-butyl-4'-hydroxyphenyl) propionate} methane.

As other examples of the antioxidant having a molecular weight of not smaller than 400, there can be particularly preferably used tocopherol type antioxidants, such as tocophenols of the α-type, β-type, γ-type and δ-type.

The antioxidant is used in an amount of from 0.01 to 1.5 parts by weight per 100 parts by weight of the polyester or the polyester composition.

The polyester composition may be blended with widely known blending agents for resins, such as an antiblocking agent like amorphous silica, a pigment like titanium dioxide (titanium white), various antistatic agents and lubricants according to a known recipe, as a matter of course.

Base material such as a metal

As a base material on which the polyester layer is to be laminated according to the present invention, there can be exemplified a metal plate, a metal foil, a paper, a plastic film and a plastic sheet. Among them, it is desired to use a metal plate. As the metal plate, there can be used various surface-treated steel plates and a light metal plate such as of aluminum.

The surface-treated steel plate will be the one obtained by subjecting a cold-rolled steel plate to the annealing, to the secondary cold rolling, and to one, two or more kinds of surface treatments such as zinc-plating, tin-plating, nickel-plating, electrochromate treatment, and chromate treatment. A preferred example of the surface-treated steel plate is an electrochromate-treated steel plate and, particularly, the one having a metal chromium layer of 10 to 200 mg/m² and a chromium oxide layer of 1 to 50 mg/m² (reckoned as metal chromium) featuring excellent film adhesion and corrosion resistance in combination. Another example of the surface-treated steel plate is a hard tin plate plated with tin in an amount of from 0.5 to 11.2 g/m². It is desired that the tin plate is subjected to the chromate treatment or to the chromate/phosphate treatment so that the amount of chromium is from 1 to 30 mg/m² reckoned as metal chromium.

There can be further used aluminum-coated steel plates plated with aluminum or clad with aluminum.

As the light metal plate, there can be used a so-called aluminum plate and an aluminum alloy plate. The aluminum alloy plate having excellent corrosion resistance and workability has a composition of 0.2 to 1.5% by weight of Mn, 0.8 to 5% by weight of Mg, 0.25 to 0.3% by weight of Zn, 0.15 to 0.25% by weight of Cu, and the remainder of Al. It is desired that even these light metal plates are subjected to the chromate treatment or to the chromate/phosphate treatment such that the amount of chromium is from 20 to 300 mg/m².

It is desired that the metal plate has a blank thickness, i.e., a thickness (tB) in the bottom of the can of, generally, from 0.100 to 0.500 mm though it may vary depending upon the use or size of the container. In the case of the surface-treated steel plate, the thickness should be from 0.10 to 0.30 mm and in the case of the light metal plate, the thickness should be from 0.15 to 0.40.

The metal foil will be a surface-treated steel foil or a light metal foil, and has a thickness of from 0.005 to 0.120 mm. The metal foil is advantageous for producing a so-called cup container.

Laminate and a method of its production

Figure 2:
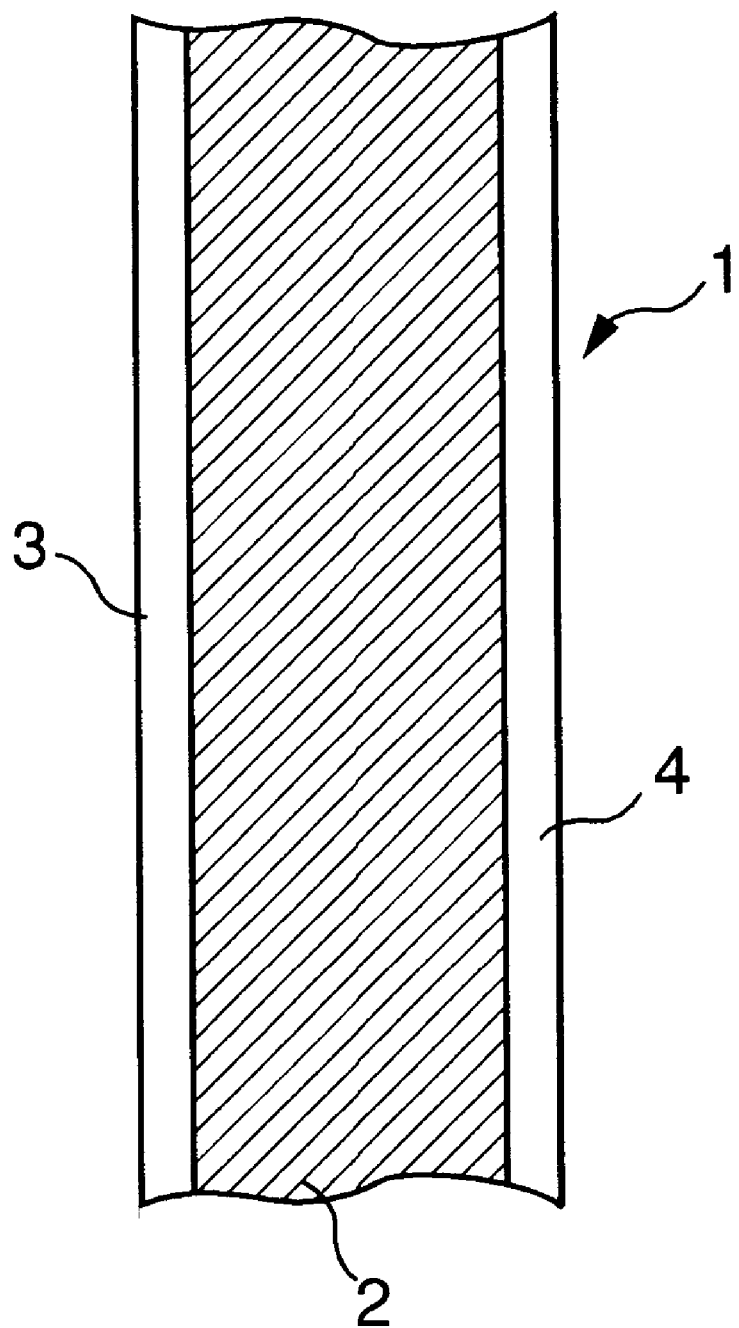
FIG. 2 is a sectional view illustrating, in cross section, an example of the structure of a laminate of the present invention.

Referring to FIG. 2 illustrating, in cross section, an example of the structure of the laminate of the present invention, the laminate 1 is constituted by a metal base 2 and a polyester composition layer 3 located on at least the inner surface side. The metal base 2 has an outer film 4 which may be the same as the polyester composition layer 3 or may be an ordinary coating material or a resin (polyester) film for cans.

Figure 3:
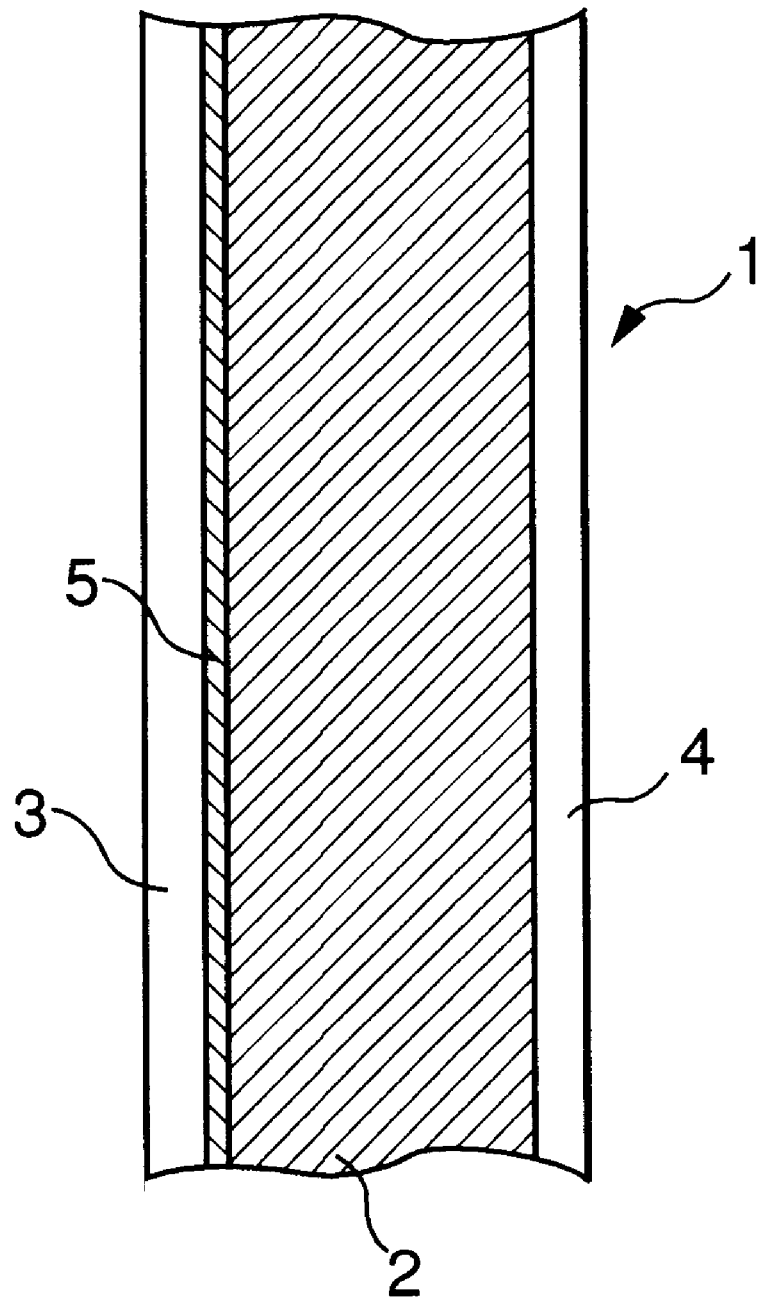
FIG. 3 is a sectional view illustrating, in cross section, another example of the structure of the laminate of the present invention.

Referring to FIG. 3 illustrating, in cross section, another example of the structure of the laminate, the structure is the same as that of FIG. 2 except the provision of a primer layer 5 for adhesion between the polyester composition layer 3 and the metal base 2.

Figure 4:
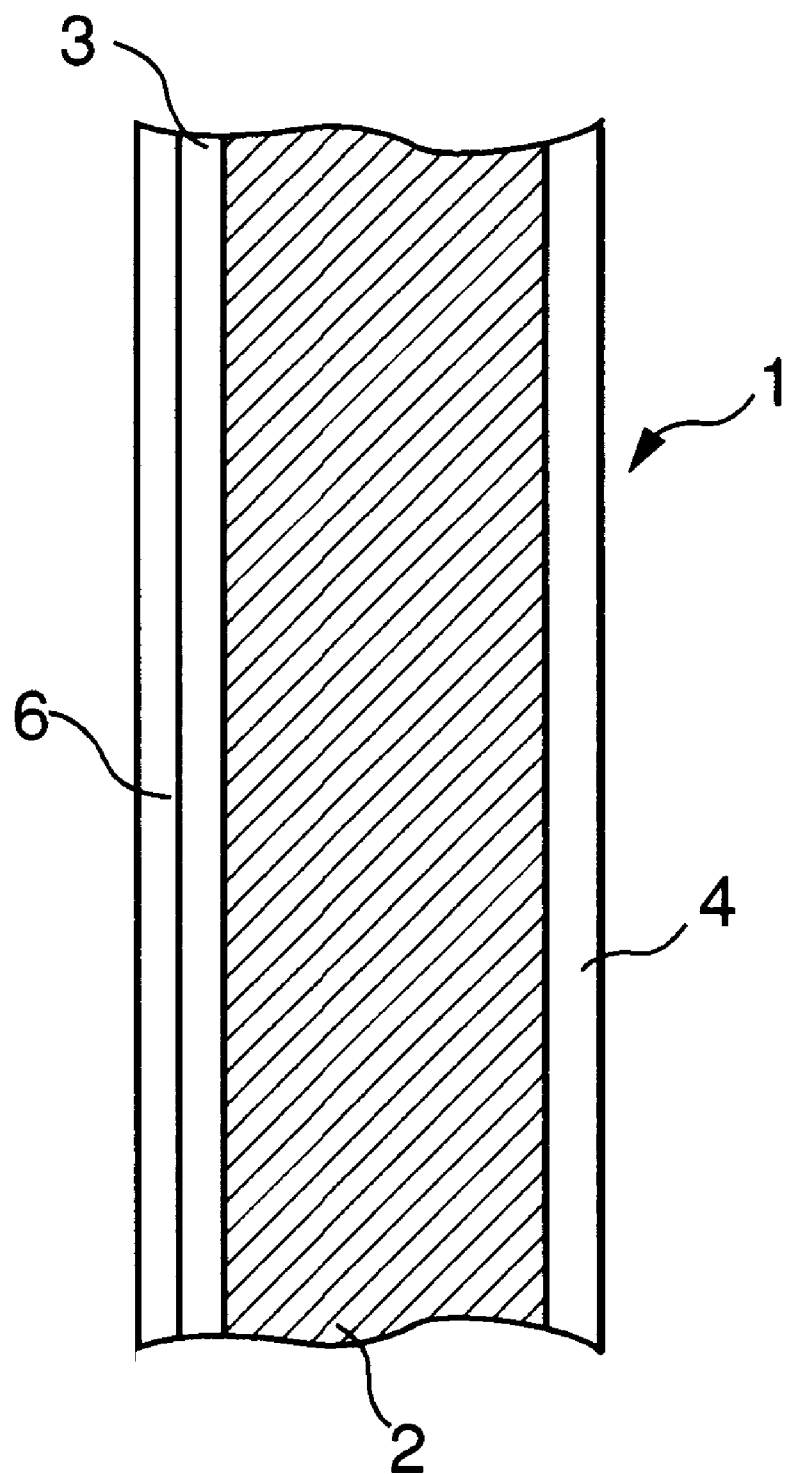
FIG. 4 is a sectional view illustrating, in cross section, a further example of the structure of the laminate of the present invention.

Referring to FIG. 4 illustrating, in cross section, a further example of the structure of the laminate, the structure is the same as that of FIG. 2 except the provision of an ethylene terephthalate type polyester surface resin layer 6 on the polyester composition layer 3 which is the underlying resin layer.

The polyester-metal laminate used in the present invention can be produced by extrusion-coating the polyester composition in a molten state on the metal base so as to be heat-adhered thereto. The polyester-metal laminate can be further produced by heat-adhering a polyester film that has been prepared in advance onto the metal base.

In the present invention, the polyester layer that is to be extrusion-coated or to be thermally adhered may be either a single layer or a multi-layer laminated structure. In the case of the multi-layer, it is desired that the underlying resin layer comprises the above-mentioned blend and the surface resin layer comprises the above-mentioned copolymerized polyester composed of not smaller than 80 mol % of the ethylene terephthalate unit and containing ethylene isophthalate unit in an amount of not larger than 20 mol %. It is desired that the surface resin layer has a glass transition point (Tg) of not lower than 70° C.

It is desired that the thickness of the polyester layer used in the present invention as a whole is from 2 to 100 μm and, particularly, from 5 to 50 μm from the standpoint of protecting the metal and workability. In the case of multiple layers, it is desired that the blend layer and the ethylene terephthalate type polyester layer have a thickness ratio of 96:4 to 4:96.

Figure 5:
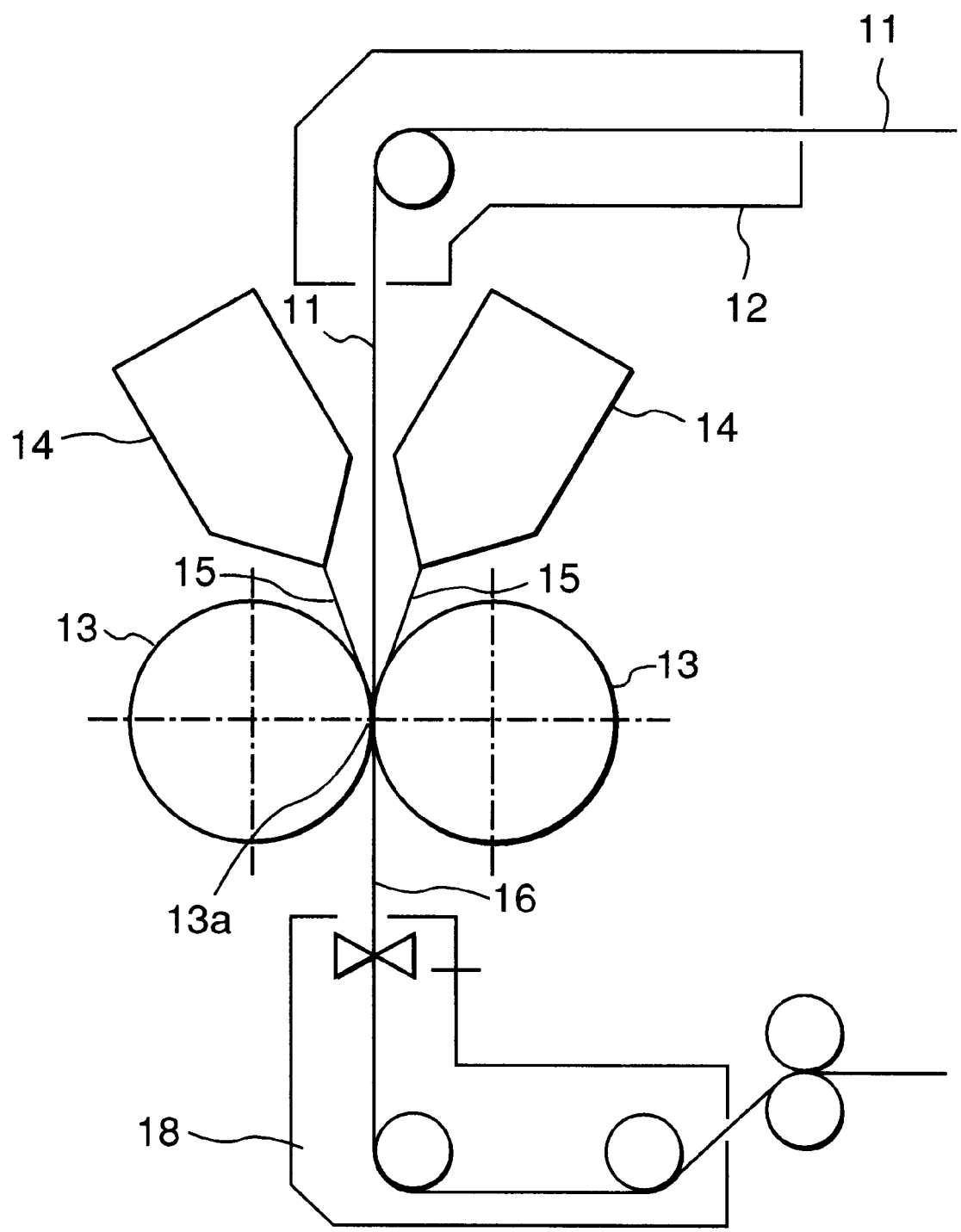
FIG. 5 is a diagram of arrangement of an apparatus for producing the laminate based on the extrusion-coating.

Referring to FIG. 5 for explaining the method of producing the polyester-metal laminate by the extrusion-coating method, a metal plate 11 is, as required, preheated by a heating device 12, and is fed to a nipping position 13a between a pair of laminate rolls 13 and 13. The polyester composition is extruded in the form of thin films 15, 15 through die heads 14, 14 of extruders arranged on both sides of the metal plate, fed into between the metal plate 11 and the laminate rolls 13, and are adhered with pressure to the metal plate 11 by the laminate rolls 13, 13. The laminate rolls 13 are maintained at a predetermined temperature, thermally adhere the thin films 15 of the polyester composition onto the metal plate 11 with the application of pressure, and cool them from both sides to obtain a laminate 16. Generally, furthermore, the thus formed laminate 16 is guided into a cooling water vessel 18 and is quickly quenched to prevent crystallization by heat.

According to the extrusion-coating method, owing to the selection of the resin composition and quick quenching through the rolls and the cooling vessel, the layer of the polyester or the polyester composition has a low degree of crystallization, i.e., has a difference of smaller than 0.05 from the amorphous density, and guarantees sufficient degree of workability for the subsequent draw working. The quenching operation is not limited to the above-mentioned example but may be such that the laminate is quickly quenched by spraying the cooling water onto the laminate that is formed.

The polyester composition is heat-adhered onto the metal base by using the heat possessed by the molten polyester layers and the heat possessed by the metal plate. In general, the metal plate is desirably heated at a temperature ($T_1$) of from 90 to 290° C. and, particularly, from 100 to 280° C., and the laminate rolls are heated at 10 to 150° C.

According to the present invention, the polyester film that has been formed in advance may be used for producing the laminate.

In this case, the polyester composition is formed into a film based upon the T-die method to obtain an over-cooled unoriented cast film. The unoriented film may be adhered by heating, or the cast film may be sequentially or simultaneously drawn biaxially by ordinary method, and the film after drawn and thermally set may be used for producing the laminate.

It is usually desired that the polyester type film has been biaxially drawn. The degree of biaxial orientation can be confirmed by the X-ray diffraction method, polarized fluorimetric method, double refraction method or density-gradient tube method. The film is biaxially drawn to such an extent that a double refraction of from 0.04 to 0.18 is exhibited. The film is usually drawn such that the area is expanded into 2.5 to 16.0 times and, particularly, into 4.0 to 14.0 times at a temperature of 80 to 110° C. and that the birefringence lies within the above-mentioned range in relation to the kind of the polyester and other conditions. The film is thermally set at 130 to 240° C. and, particularly, at 150 to 230° C. so as to satisfy the above-mentioned conditions.

When a primer for adhesion is used, though it is not generally required, it is desired to treat the surface of the biaxially drawn polyester film with corona discharge to enhance the adhesion of the film to the primer for adhesion. It is desired that the treatment with corona discharge is effected to such a degree that the wet tension is not smaller than 44 dynes/cm.

In addition, the film may be treated on its surfaces with plasma or flame in a customary manner to improve adhesiveness or may be coated with an urethane resin or a modified polyester resin to improve adhesiveness.

Figure 6:
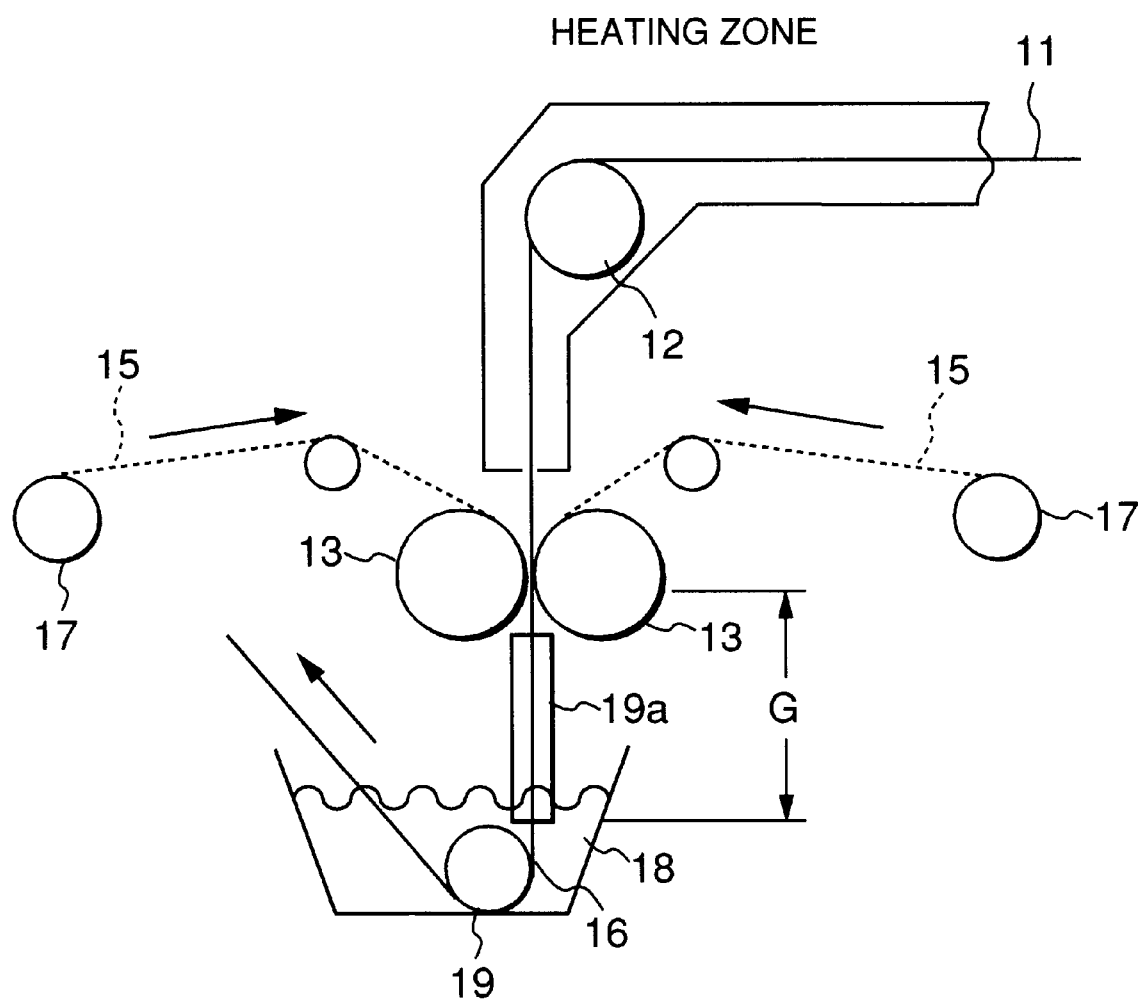
FIG. 6 is a diagram illustrating the arrangement of an apparatus for producing the laminate based on the thermal adhesion of a film.

Referring to FIG. 6 for explaining the laminating method by using the polyester film, the metal plate 11 is heated by a heating roll 12 at a temperature ($T_1$) higher than the melting point (Tm) of the polyester, and is supplied to between the laminate rolls 13 and 13. The polyester films 15 are unwound from the feed rolls 17 and are supplied to between the laminate rolls 13 and 13 in manner to sandwich the metal plate 11 in between. The laminate rolls 13 and 13 are maintained at a temperature ($T_2$) slightly lower than the heating roll 12, and the polyester films are heat-adhered to both surfaces of the metal plate 11. Under the laminate rolls 13, 13 is provided a water vessel containing the cooling water 18 for quickly quenching the laminate 16 that is formed, and a guide roller 19 is disposed in the water vessel for guiding the laminate. A predetermined gap G is maintained between the laminate rolls 13, 13 and the cooling water 18, a heat-retaining mechanism 19a is provided in the gap G to maintain a predetermined temperature range ($T_3$), so that a peak in the biaxial orientation occurs due to the return of the orientation on the way in the direction of thickness of the film in a state where the polyester shifts from the molten phase into the solid phase.

The temperature ($T_1$) for heating the metal plate is generally from Tm+0° C. to Tm+100° C. and, particularly, from Tm+0° C. to Tm+50° C., and the temperature $T_2$ for heating the laminate rolls 13 is from 70 to 180° C. and, particularly, from 80 to 150° C. Upon setting the temperature as described above, the polyester on the metal plate develops a temperature gradient corresponding to the above-mentioned temperature difference. The temperature gradient gradually extinguishes. Here, a portion on the way from the surface of the polyester to the metal plate is permitted to pass, spending a sufficient period of time, through a temperature region where the orientation returns while the molten phase is being shifted into the solid phase. For this purpose, the laminate that has passed through the laminate rolls is maintained for its temperature through the heat-retaining zone.

The adhesive primer that is provided as desired between the polyester film and the metal blank exhibits excellent adhesiveness to both the metal blank and the polyester composition layer. A representative example of the primer coating material that exhibits excellent adhesiveness and corrosion resistance is a phenol epoxy type coating material comprising a bisphenol type epoxy resin and a resol type phenolaldehyde resin which is derived from various phenols and a formaldehyde. In particular, the coating material contains the phenol resin and the epoxy resin at a weight ratio of from 50:50 to 5:95 and, particularly, from 40:60 to 10:90.

The adhesive primer layer is usually provided maintaining a thickness of from 0.01 to 10 $\mu$m. The adhesive primer layer may be provided on the metal blank in advance.

According to the present invention, the method of producing the laminate is in no way limited to the above-mentioned method only. That is, the laminate can be produced even by the so-called sandwich lamination method according to which the above-mentioned polyester or the polyester composition is melt-extruded onto between the metal base and the drawn or undrawn film that has been formed in advance. This means has an advantage in that a plurality of resins having very different melting points and resins having poor adhesiveness to the base material can be laminated This means can, of course, be advantageously used for laminating the ethylene terephthalate type highly crystalline polyester film on the metal base via the above-mentioned polyester blend that is melted.

Seamless can and its production

Figure 7:
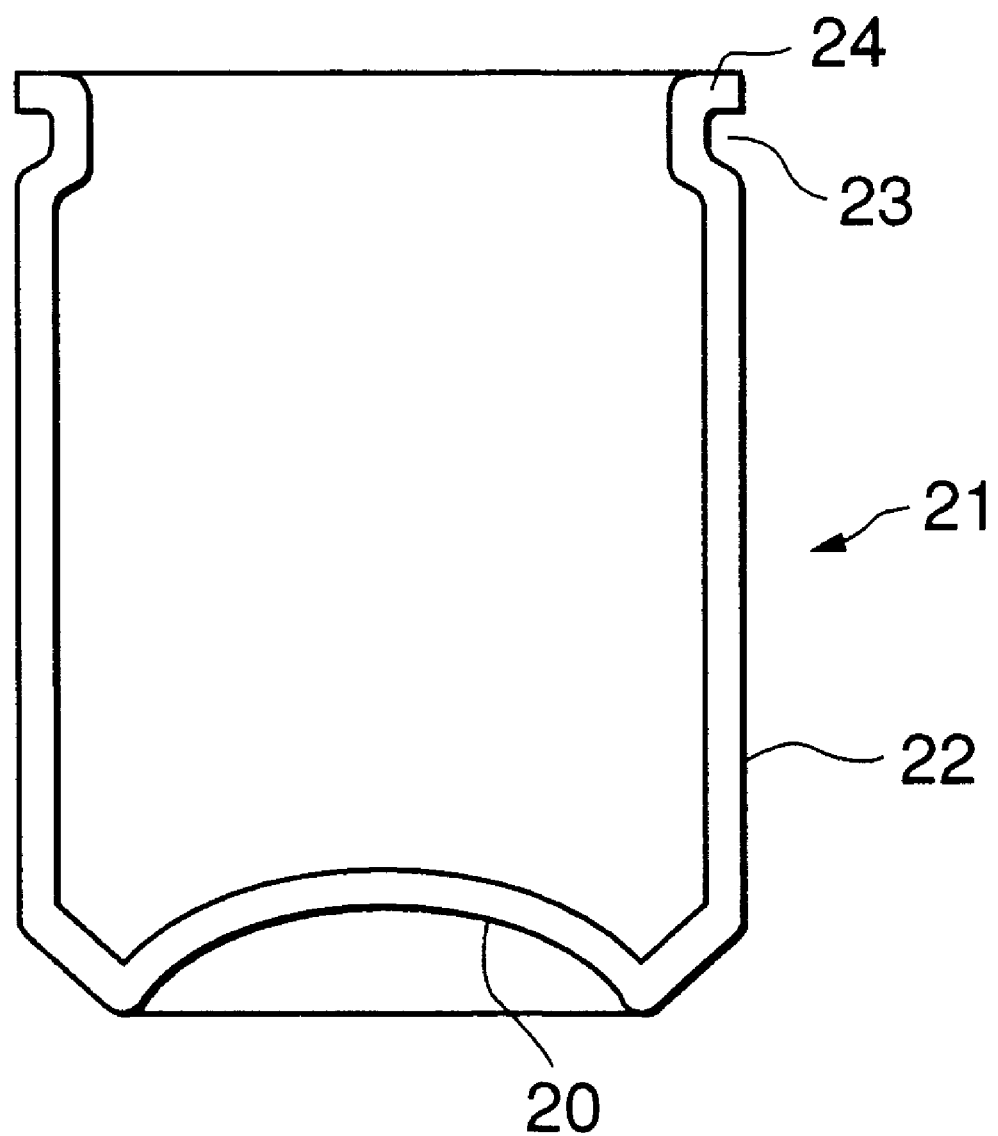
FIG. 7 is a side sectional view illustrating the structure of a seamless can of the present invention.

Referring to FIG. 7 which illustrates a seamless can of the present invention, the seamless can 21 is obtained by bend-elongating the above-mentioned polyester-metal laminate 1 relying upon the draw-redraw working or further effecting the ironing, and comprises a bottom portion 20 and a side wall portion 22. As required, a flange portion 24 is formed at the upper end of the side wall portion 22 via a neck portion 23. In this can 21, due to the bend-elongation or the subsequent ironing, the side wall portion 22 has a thickness which is decreased to 20 to 95% and, particularly, 30 to 85% of the initial thickness of the laminate as compared to the bottom portion 20.

According to the present invention, the seamless can is produced by draw-deep-draw working the above-mentioned polyester-metal laminate into a cup with bottom between a punch and a die, and by further effecting the bend-elongation and ironing through the step of deep-drawing to reduce the thickness of the side wall of the cup. That is, the deformation for reducing the thickness is based on a combination of a deformation (bend-elongation) by the load in the axial direction of the can (direction of height) and a deformation (ironing) by the load in the direction of thickness of the can, which are executed in this order. The bend-elongation imparts molecular orientation in the direction of c-axis of the ethylene terephthalate unit, and the ironing imparts molecular orientation in parallel with the film surface of benzene plane of the ethylene terephthalate unit.

According to the present invention, the seamless can is produced by draw working or further deep-draw working the above-mentioned polyester-metal laminate into a cup with bottom and, preferably, by effecting the bend-elongation or bend-elongation and ironing in the step of deep-drawing to reduce the thickness of the side wall of the cup.

In the deep-draw bend-elongation (draw, bend-elongation, redraw working), for example, the pre-drawn cup formed of the coated metal plate is held by an annular holding member inserted in the cup and the redraw die located thereunder. The redraw punch is disposed in concentric with the holding member and the redraw die so as to enter into, and come out of, the holding member. The redraw punch and the redraw die are moved in mesh with each other and relative to each other.

The side wall portion of the pre-drawn cup is perpendicularly bent inwardly of the diameter from the outer peripheral surface of the annular holding member through the corner of curvature, passes through a portion defined by the annular bottom surface of the annular holding member and the upper surface of the redraw die, nearly perpendicularly bent by the working corner of the redraw die toward the axial direction, so as to form a deep-draw worked cup having a diameter smaller than that of the pre-drawn cup.

Here, the radius of curvature (Rd) of the working corner of the redraw die is selected to be 1 to 2.9 times and, particularly, 1.5 to 2.9 times as great as the thickness (tB) of the metal blank, so that the thickness of the side wall portion is effectively reduced by the bend-elongation. Not only this, a change in the thickness is eliminated in the lower portion and upper portion of the side wall, and the thickness is uniformly reduced over the whole surfaces. In general, the side wall portion of the can barrel can be reduced to not larger than 80 with the blank thickness (tB) as a reference, and down to 45% and, particularly, down to 40%.

In the case of the deep-drawn can, the draw ratio RD defined by the following numeral formula (5), $$RD = \frac{D}{d} \quad (5)$$

wherein D is a diameter of the sheared laminate, and d is a diameter of the punch, is from 1.1 to 3.0 through the first stage, and is from 1.5 to 5.0 as a total.

In the redraw working or bend-elongation, the ironing portion may be disposed at the back of the bend-elongation working portion of the redraw die to subject the side wall portion to the ironing.

It is desired that the thickness is reduced through the bend-elongation or the ironing to accomplish the reduction ratio RI as defined by the following numerical formula (6), $$RI = \frac{tB - tW}{tB} \times 100 \quad (6)$$

wherein tB is a thickness of the blank and tW is a thickness of the side wall portion,
of 20 to 95% and, particularly, 30 to 85%.

In conducting the draw working, it is desired that the coated metal plate or the cup is subjected to the working upon being coated with various lubricants such as fluidized paraffin, synthetic paraffin, edible oil, hydrogenated edible oil, palm oil, various natural waxes or polyethylene wax. In general, the lubricant is applied in an amount of from 0.1 to 10 mg/dm² and, particularly, from 0.2 to 5 mg/dm² though it may differ depending upon its kind, in a molten state by being sprayed onto the surface.

To improve draw-formation into a cup, it is advantageous to effect the formation in a state where the resin layer can be easily plastically fluidized by setting the temperature of the polyester-coated draw-formed cup to be higher than the glass transition point (Tg) of the polyester layer and, particularly, lower than the thermal crystallization temperature.

The metal cup having an organic coating on the inner surface thereof after formed is cut or is subjected to the so-called trimming at the ear portion in the opening portion of the cup, and is then put to the printing step. Prior to the trimming, the cup may be heated at a temperature higher than the glass transition point (Tg) of the coated resin but is lower than its melting point to relax the strain in the coated resin. In the case of the thermoplastic resin, this operation is particularly effective in enhancing the adhesion between the coating and the metal.

Figure 8:
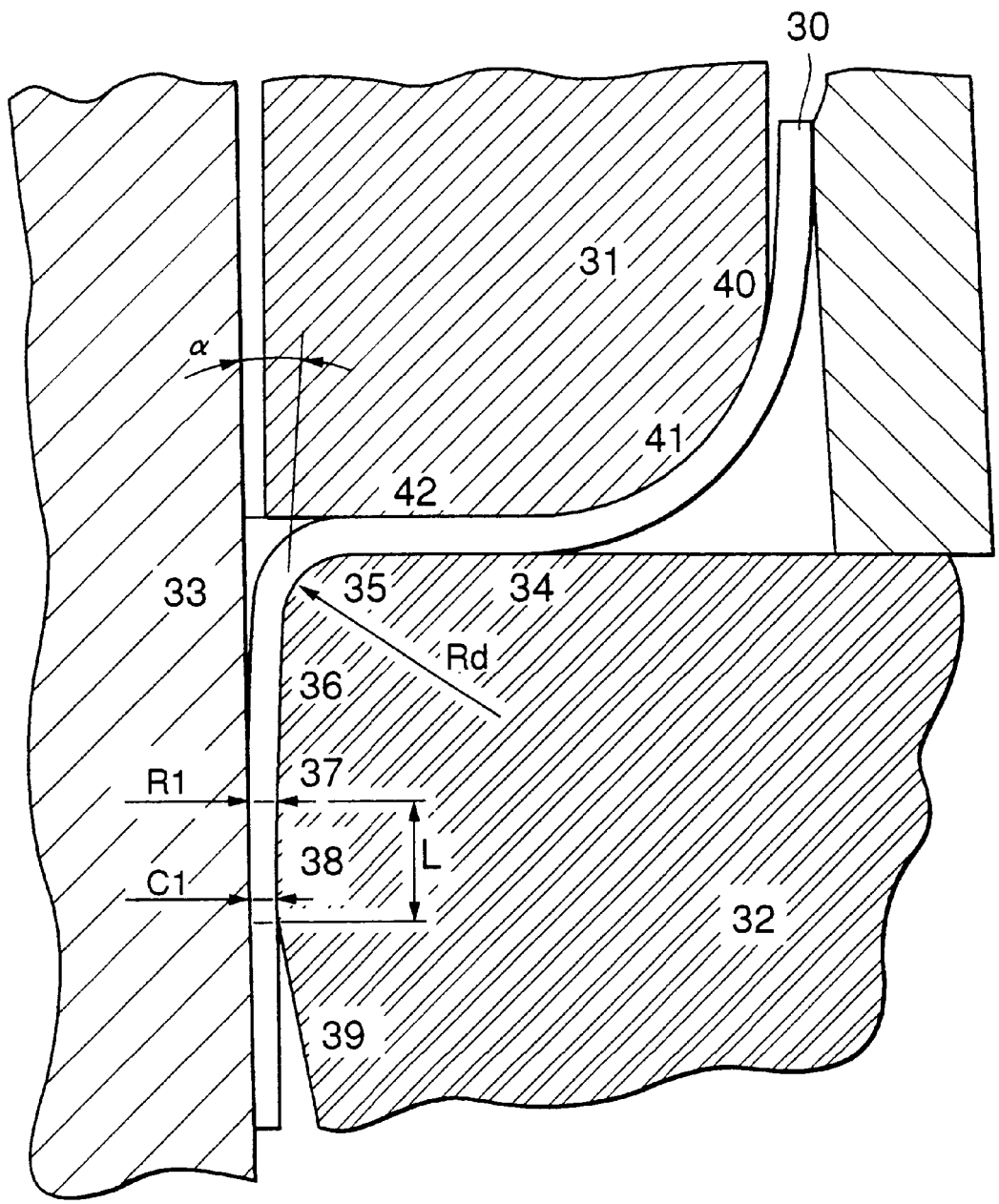
FIG. 8 is a sectional view for explaining drawing ironing forming of a laminate.

Preferably, the laminate is draw-ironed in accordance with the following means. That is, as shown in FIG. 8, a pre-drawn cup 30 formed of the coated metal plate is held by an annular holding member 31 inserted in the cup and the redraw-ironing die 32 positioned thereunder. A redraw-ironing punch 33 is provided in concentric with the holder member 31 and the redraw-ironing die 32, in a manner to enter into, and come out of, the holding member 31. The redraw-ironing punch 33 and the redraw-ironing die 32 are moved in mesh with each other and relative to each other.

The redraw-ironing die 32 has a flat portion 34 in the upper part thereof, has a working corner 35 of a small radius of curvature at the peripheral edge of the flat portion, has a tapered approach portion 36 of which the diameter decreases downwardly in the periphery continuous to the working corner, and has a cylindrical land portion (ironing portion) 38 for ironing continuous to the approach portion via a curvature portion 37. Under the land portion 38 is formed a grinding undercut 39 of a reversed tapered shape.

The side wall of the pre-drawn cup 30 moves from the outer peripheral surface 40 of the annular holding member 31 through the curvature corner 41 and is perpendicularly bent inwardly of the diameter, passes through a portion defined by the annular bottom surface 42 of the annular holding member 31 and the flat portion 34 of the redraw die 32, nearly perpendicularly bent in the axial direction by the working corner 35 of the redraw die 32, and is formed into a deep-drawn cup having a diameter smaller than that of the predrawn cup 30. At the working corner 35, in this case, a portion of the side opposite to the side contacting to the corner portion 35 is elongated by bending, whereas a portion of the side in contact with the working corner 35 is elongated by return deformation after it has separated away from the working corner, so that the thickness of the side portion is reduced by bend-elongation.

The side wall of which the thickness is reduced by bend-elongation comes on the outer surface thereof into contact with the approach portion 36 of a small taper angle of which the diameter of the outer surface gradually decreases, and is guided to the ironing portion 38 with the inner surface thereof being in a free state. The step in which the side wall passes through the approach portion precedes the subsequent ironing step, and stabilizes the laminate after it is bend-elongated, and slightly decreases the diameter of the side wall to be ready for the ironing work. That is, the laminate immediately after the bend-elongation is affected by vibration caused by the bend-elongation, contains distortion in the film, and is still in an unstable condition. When the laminate is readily subjected to the ironing, therefore, it becomes difficult to carry out smooth ironing. By bringing the outer surface of the side wall into contact with the approach portion 36 to decrease its diameter and by placing the inner surface thereof in a free state, however, it is made possible to eliminate the effect of vibration, to relax uneven strain in the film, and to smoothly carry out the ironing working.

The side wall that has passed through the approach portion 36 is introduced into a gap between the land portion (ironing portion) 38 for ironing and the redraw-ironing punch 33, and is rolled into a thickness defined by this gap (C1). The thickness C1 of the final side wall is set to be from 20 to 95% and, particularly, from 30 to 85% of the initial thickness (t) of the laminate. The curvature portion 37 on the introduction side of the ironing portion works to smoothly introduce the laminate into the ironing portion 38 while effectively fixing the ironing start point, and the grinding undercut 39 of a reversed taper shape under the land portion 38 prevents an excess of working force.

The radius of curvature Rd of the curvature corner 35 of the redraw-ironing die 32 should not be larger than 2.9 times of the thickness (t) of the laminate from the standpoint of effectively executing the bend-elongation. When the radius of curvature is too small, however, the laminate is broken. Therefore, the radius of curvature Rd should be larger than 1 times of the thickness (t) of the laminate.

The tapered approach portion 36 should have an approach angle (one-half of taper angle) α of 1 to 5°. When the approach angle is smaller than the above-mentioned range, the orientation is not sufficiently relaxed in the polyester film layer and the polyester film layer is not stabilized to a sufficient degree. When the approach angle is larger than the above-mentioned range, the bend-elongation becomes uneven (return deformation is insufficient). In either case, it becomes difficult to smoothly carry out the ironing without accompanied by cracking or peeling of the film.

The clearance between the land portion 38 for ironing and the redraw-ironing punch 33 lies within the above-mentioned range, and the land has a length L which is usually from 0.5 to 30 mm. When the length is larger than the above-mentioned range, the working force becomes too great. When the length is smaller than the above-mentioned range, the amount of return becomes too large after the ironing working, which is not desirable.

In the seamless can of the present invention, the polyester layer of the flange portion is subjected to the severe wrap-seaming working. It is therefore desired that the polyester layer in this portion is mildly worked compared to the polyester layer on the side wall of the can. This makes it possible to enhance the sealing property and corrosion resistance of the wrap-seamed portions. For this purpose, a flange-forming portion thicker than the side wall of the can is formed at the upper end of the side wall of the can after ironed. That is, if the thickness of the side wall of the can is denoted by t1 and the thickness of the flange portion by t2, it is desired that the ratio t2/t1 is set to lie from 1.0 to 2.0 and, particularly, from 1.0 to 1.7.

Figure 9:
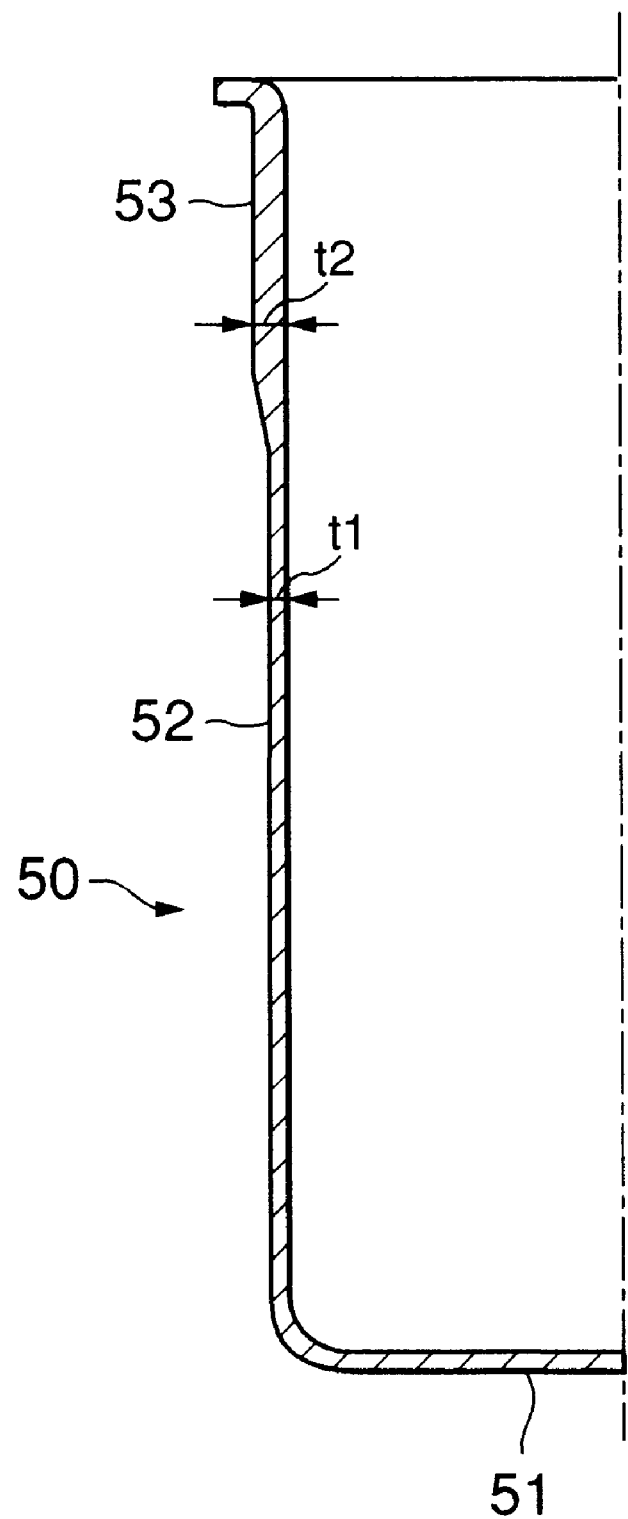
FIG. 9 is a sectional view illustrating an example of a flange portion of the seamless can of the present invention.
Figure 10:
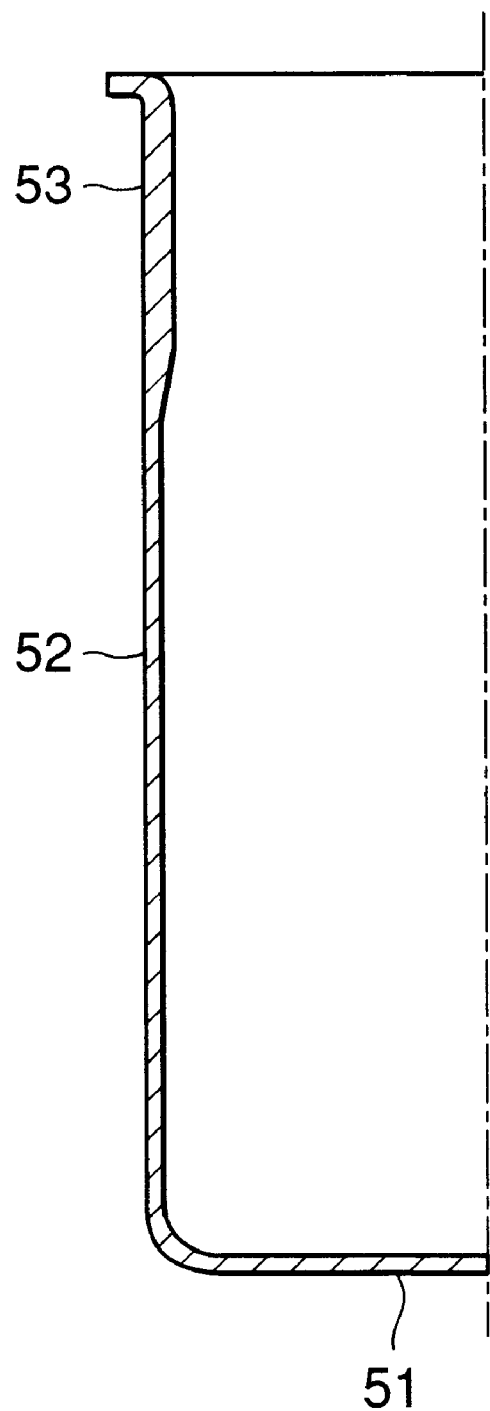
FIG. 10 is a sectional view illustrating another example of the flange portion of the seamless can of the present invention.
Figure 11:
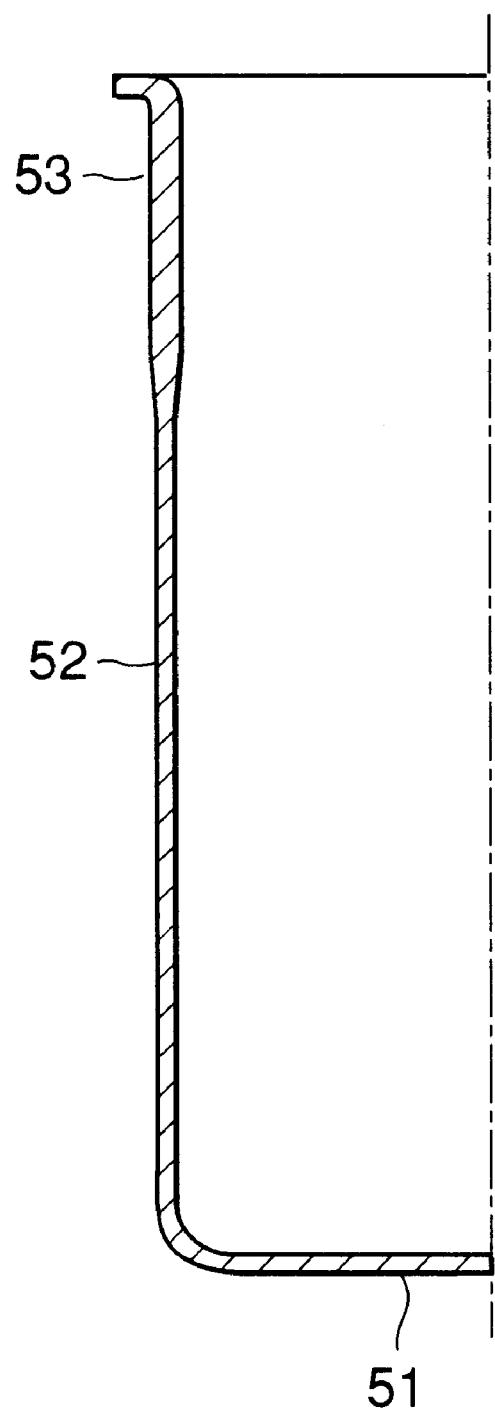
FIG. 11 is a sectional view illustrating a further example of the flange portion of the seamless can of the present invention.

Referring to FIGS. 9, 10 and 11 illustrating the seamless can after redraw-ironing working, the seamless can 50 comprises a bottom portion 51 having a thickness nearly the same as that of the blank, and a side wall portion 52 having a thickness reduced by the redraw-ironing working. Here, on the upper part of the side wall 52 is formed a flange-forming portion 53 having a larger thickness.

The flange-forming portion 53 has various structures. In an example shown in FIG. 10, the outer surface of the side wall 52 and the outer surface of the flange-forming portion 53 are on the cylindrical plane of the same diameter, and the inner surface of the flange-forming portion 53 has a diameter smaller than that of the inner surface of the side wall 52. The flange-forming portion 53 of this type is formed by permitting the portion where the flange-forming portion 53 is located to have a diameter smaller than that of other portions, the flange-forming portion 53 being formed by drawing the side wall by the redraw-ironing punch 32.

In an example of the flange-forming portion 53 shown in FIG. 9, the inner surface of the side wall 52 and the inner surface of the flange-forming portion 53 are on the cylindrical plane of the same diameter, and the outer surface of the flange-forming portion 53 has a diameter larger than that of the outer surface of the side wall 52. The flange-forming portion 53 of this type is formed by decreasing the length L of the land portion of the redraw-ironing die, and forming a portion of a diameter smaller than that of the land portion to be continuous to the land portion, so that the flange-forming portion 53 is return-deformed.

In an example of the flange-forming portion 53 shown in FIG. 11, the outer surface of the flange-forming portion 53 has a diameter larger than the outer surface of the side wall 52 but the inner surface of the flange-forming portion 53 has a diameter smaller than that of the inner surface of the side wall 52. The flange-forming portion 53 of this type is formed by permitting the portion where the flange-forming portion 53 is located to have a diameter smaller than that of other portions, the flange-forming portion 53 being formed by drawing the side wall by the redraw-ironing punch 32, by decreasing the length L of the land portion of the redraw-ironing die, and by forming a portion having a diameter smaller than the land portion to be continuous to the land portion, so that the flange-forming portion 53 is return-deformed.

The seamless can according to the present invention can be subjected to at least one stage of heat treatment inclusive of the above-mentioned printing step. The heat treatment has many objects; i.e., the principal objects are to remove residual distortion in the film caused by the working, to volatilize the lubricant used for the working from the surface, and to dry and cure the printing ink printed on the surface. The heat treatment is carried out by using a known heating device such as infrared-ray heater, hot air circulation furnace, induction heating device, etc. The heat treatment can be conducted in one stage or in two or more stages. The temperature of the heat treatment is suitably from 180 to 240° C. The heat-treating time is, generally, from one second to five minutes.

After the heat treatment, the container may be quickly quenched or may be left to cool. That is, the film or the laminated plate can be quickly quenched. However, a container has a three-dimensional shape and the metal has a large quantity of heat, requiring cumbersome quenching operation in an industrial sense. According to the present invention, however, the crystal growth is suppressed even without the quick quenching operation, and excellent characteristics are obtained in combination. As required, quenching means may be employed such as blowing the cool air, sprinkling the cooling water, etc., as a matter of course.

Among the laminates of the present invention, those obtained by the extrusion-coating method and by using a cast film have the polyester composition layer which is substantially unoriented. However, many advantages are obtained such as mechanical strength of the polyester composition layer on the side wall having a reduced thickness and barrier property against the corrosive components, since the polyester layer on the side wall is monoaxially oriented in the axial direction of the can at the time of draw working or redraw working. The polyester layer remains substantially unoriented on the bottom of the seamless can, as a matter of course. On account of the reasons mentioned above, however, the polyester layer on the bottom of the can maintains excellent dent resistance.

It is desired that the polyester layer on the side wall of the seamless can of this type has a birefringence (Δn) of from 0.02 to 0.3 as measured relying upon the double refraction method in compliance with the following formula (7), $$\Delta n = n_1 - n_2 \tag{7}$$

wherein $n_1$ is a refractive index of the film in the direction of its maximum orientation, and $n_2$ is a refractive index of the film in the direction of thickness thereof.

Among the laminates of the present invention, on the other hand, the one using the biaxially drawn film has the polyester composition layer that is substantially biaxially oriented. During the above-mentioned draw working or the redraw working, however, the polyester layer on the side wall is monoaxially oriented in the axial direction of the can to assume a complex molecularly oriented state. In either case, many advantages are obtained in regard to mechanical strength of the polyester composition layer on the side wall having a reduced thickness and barrier properties against the corrosive components, owing to the molecular orientation. The polyester layer can maintainfurther excellent corrosion resistance and dent resistance by remaining a biaxial orientation in the layer on the bottom of the seamless can.

The polyester composition layer of the laminate using the biaxially drawn film has a birefringence ($\Delta n$) defined by the following formula (4), $$\Delta n_{1-3} = n_m - n_t \tag{4}$$

wherein $n_m$ is a refractive index of the film in the direction of a maximum orientation, and $n_t$ is a refractive index of the film in the direction of thickness thereof, wherein, when a value on the surface of the film is denoted by $\Delta n_1$, a value at an intermediate position of the film from the surface of the layer to the metal plate is denoted by $\Delta n_2$, and a value on the side in contact with the metal plate by $\Delta n_3$, then, there is a feature in that at least one of $\Delta n_1$ or $\Delta n_2$ is not smaller than 0.02, and $\Delta n_3$ is smaller than $\Delta n_1$ or $\Delta n_2$.

In this structure of orientation distribution, the highly oriented layer exists in the surface layer and in the intermediate layer making it possible to prevent the passage of corrosive components, to prevent the adsorption of aromatic components and to enhance the shock resistance. Furthermore, the lowly oriented layer that is present on the side where it is in contact with the metal plate helps improve the adhesiveness.

In Table 4, the results of the dent ERV testing to various birefringences of laminates and heat-treated laminates (a bottom of a can is imagined.) are shown. In the examples shown in Table 4, birefringences of laminates were adjusted by changing a plate temperature at laminating.

The [η] of the film was 0.64, and the ester interchange ratio of the film was 5.0%.

When the birefringence ($\Delta n1$ and $\Delta n2$) of the laminate is not smaller than 0.02, a good dent resistance tends to be obtained. Wherein, ERV (enamel rater value) means by the evaluation for cracks in a film after being dented represented by a current at 6.3 Volt. And further, even if the birefringence ($\Delta n1$ and $\Delta n2$) of the laminate is not smaller than 0.02, heat-treating at high temperature tends to make ERV increase a little.

Anyway, it is desired that birefringence ($\Delta n1$ and $\Delta n2$) of the laminate and the bottom of a seamless can in which a biaxially stretched film is used, is nto smaller than 0.02.

As desired, the obtained can is subjected to the necking through one stage or many stages, and is subjected to the flanging working to obtain a can for wrap-seaming. Prior to the necking, furthermore, the can may be subjected to the beading or to the circumferentially polyhedral wall working as disclosed in Japanese Patent Publication No. 5128/1995.

Upon putting the can of the present invention to the circumferentially polyhedral wall working, there is obtained a structure with which the side wall is little deformed by the external pressure and exhibits excellent strength against the pressure, enabling the can body to be easily held by hand and offering particular design.

Figure 12:
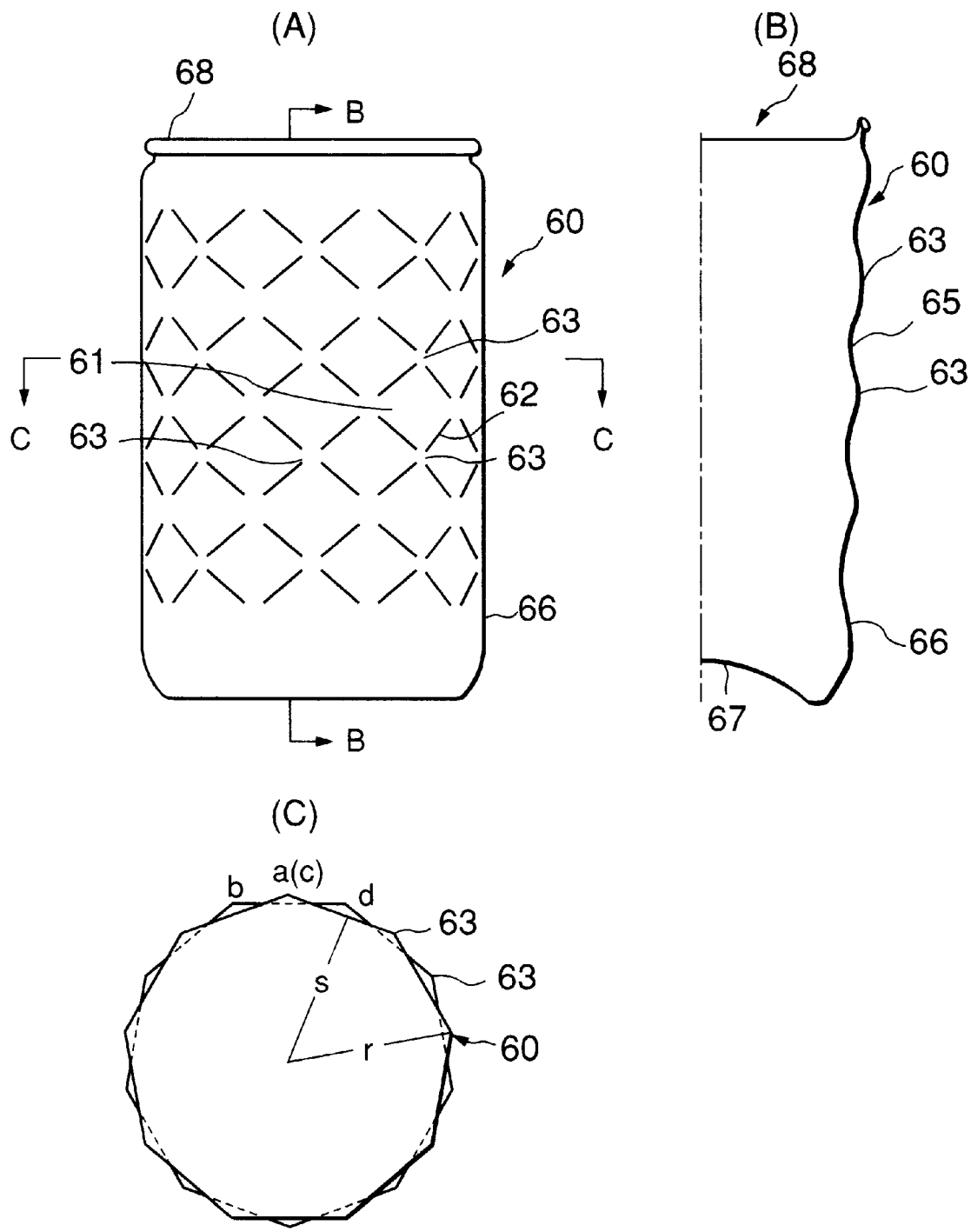

Referring to FIG. 12 illustrating a can having a circumferentially polyhedral wall of the present invention, FIG. 12(A) is a side view of the container, FIG. 12(B) is a side sectional view illustrating a portion thereof, and FIG. 12(C) is a horizontal sectional view. The container 60 comprises a side wall 66 having an opening at the upper part thereof and a closed bottom 67 that are formed by draw-ironing the above-mentioned laminate, and a closure 68 provided by being wrap-seamed at the upper end portion. The barrel 60 is formed of a circumferentially polyhedral wall which includes constituent unit surfaces 61, boundary ridges 62 along which the constituent unit areas are abut to each other, and intersecting portions 63 at where the boundary ridges intersect one another. The boundary ridges 62 and the intersecting portions 63 are protruding outwardly of the container compared to the constituent unit surfaces, and the portions 65 among the intersecting portions at where the constituent unit surfaces 61 are opposed to one another are relatively dented inwardly of the container. On the polyhedral wall, furthermore, the constituent unit surfaces 61 are neighboring in the axial direction of the container forming a difference in phase.

In this embodiment, the constituent unit surface 1 is comprised of a quadrilateral (rhombus) abcd (see FIG. 13), and the neighboring constituent unit surfaces 1 are arranged in the axial direction of the container maintaining a difference of just one-half the phase.

Figure 13:
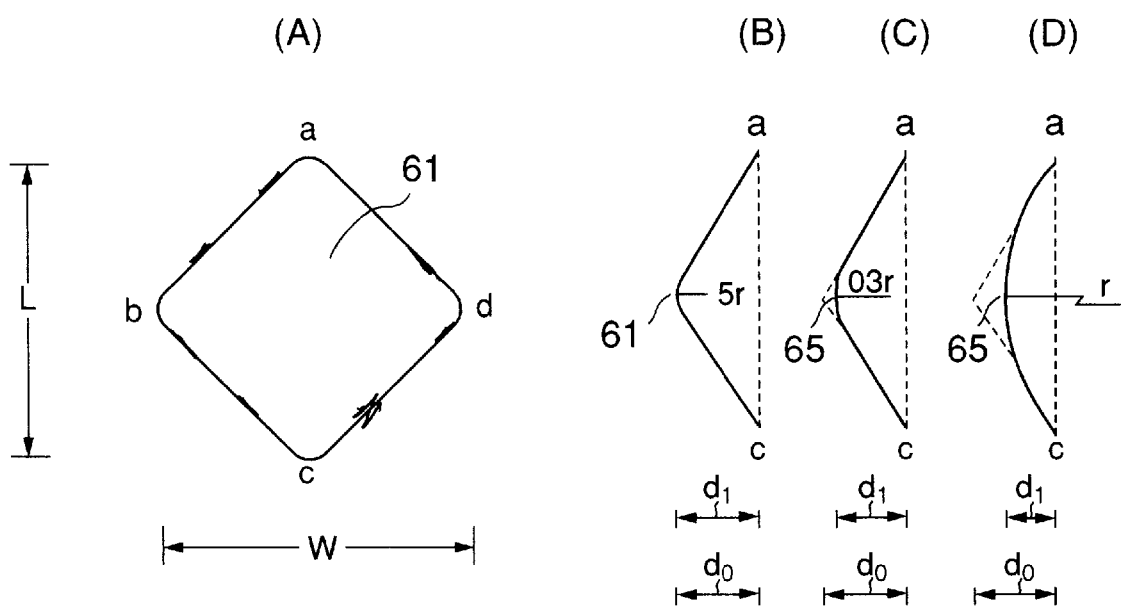

FIG. 13 is a diagram illustrating the constituent unit surface, wherein FIG. 13(A) is a plan view of the constituent unit plane, FIGS. 13(B), 13(C) and 13(D) are diagrams illustrating, in vertical cross section, the central portions of the constituent unit surfaces having radii of curvature R of dents. FIG. 13(A) shows a quadrilateral unit surface 61 of a polyhedral wall used for the container barrel of FIG. 12, wherein a rhombus abcd forms a constituent unit surface 61. The sides ab, bc, cd and da of the rhombus correspond to the boundary ridges 62 formed on the side wall of the container, and vertexes a, b, c and d that are outwardly protruded correspond to the intersecting portions 63.

When the side wall is that of a cylinder, the upper vertex a and the lower vertex c are located on the circumferential plane of the same diameter, and the left vertex b and the right vertex d are located on the circumferential plane of the same diameter. When the arrangements maintain a difference of one-half phase, all vertexes are located on the circumferential plane of the same diameter. As shown in FIG. 12(C), the inner radius of the container barrel corresponding to these vertexes is a maximum radius r. On the other hand, the ridges ab, bc, cd and da protrude most outwardly of the radius at their ends but have a decreasing distance or radius toward the intermediate portions from the central axis of the container. The radius at an intermediate point of a diagonal line bd in the circumferential direction is smaller than the radius r, and gives a minimum radius in the case of FIG. 12(C). When the unit surface on the container drum is projected in the axial direction, the vertexes a and c are overlapped, but the diagonal line ac in the axial direction does not overlap the diagonal line bd in the circumferential direction but is positioned on the outer side beyond the diagonal line bd in the radial direction, and the quadrilateral abcd forms a smoothly curved surface.

Referring to the rhombic size of the constituent unit surface of FIG. 13(A), if the length of the diagonal line bd in the circumferential direction is denoted by w and the height of the diagonal line ac in the axial direction by L, then, w and L denote a maximum width of the constituent unit surface in the circumferential direction and a maximum length thereof in the axial direction. The length of the cross section ac on the practical constituent unit surface is longer than the length ac (height L) of the diagonal line in the axial direction, and the cross section ac describes a curve that is smoothly dent inwardly of the container. The length of the cross section ac on the constituent unit surface decreases with an increase in the radius of curvature of dent R=5t (FIG. 13(B)), R=0.3r (FIG. 13(C)) and R=r (FIG. 13(D)).

In the constituent unit surfaces, the length (w) of the diagonal line bd in the circumferential direction may not often be the same as the length of the cross section bd on the practical constituent unit surface. Referring, for example, to FIG. 12(C), the diagonal line bd in the circumferential direction is in agreement with the cross section bd on the practical constituent unit surface, and their lengths are the same. However, a point at the middle of the side of this cross section may often be positioned on the outer side or on the inner side in the radial direction of the position of the diagonal line bd in the circumferential direction.

In the example shown in FIGS. 12 and 13, the cross section ac is smoothly curved and the cross section bd is substantially straight. In another example of FIG. 12, however, both the cross section ac and the cross section bd are smoothly curved to be inwardly dented.

The laminate of the present invention can also be used for the production of an adhered can having an overlap-joined portion. The adhered can is produced by a known method. For example, a thermoplastic organic adhesive in the form of a tape is melt-adhered to both ends of a rectangular laminated plate that is a blank of the can barrel, the laminated plate is bent in a cylindrical shape, the ends onto where the organic adhesive agent is melt-adhered are heated and are overlapped in such a manner that the adhesive adheres to each other and, then, the overlapped portion is adhered with pressure and is cooled to complete the adhesion.

Here, in order to prevent the metal from being exposed at the cut end of the laminate which comes to the inside of the seam of the can barrel, the tape-like adhesive is adhered in a manner that a portion thereof in the direction of width is left as a fold-back portion, and this fold-back portion is folded nearly by 180 degrees so as to surround the cut end thereby to cover and protect the cut end.

As the thermoplastic organic adhesive, there can be used a copolyamide adhesive, a copolyester adhesive or the like adhesive in the form of a tape.

The laminate of the present invention can be further used for producing welded cans. The welded cans are produced by using a known electric resistance welding based on the lap welding or the butt welding. For example, both ends of a rectangular laminated plate which serves as a blank of the can barrel is placed in a state where no polyester film has been applied thereto or in a state from where the polyester film layer is removed by polishing. The laminated plate is bent in a cylindrical form and the ends where the metal is exposed are overlapped one upon the other, and the overlapped portion is adhered with pressure and a current is supplied to form a seam by welding.

In the seam formed by welding, the metal is exposing and, hence, provision is made of a resin covering layer that intimately adheres to the exposed metal surface. Suitable examples of the resin covering layer will be those of a copolyester resin, copolyamide resin or the like resin.

EXAMPLES

The invention will now be described by way of the following working examples.

According to the present invention, the properties were measured according to the following measuring methods.

(1) Melt viscosity ratio, melt viscosity, melt tension, dieswell

Use was made of the Capillograph, Model 1B, manufactured by Toyo Seiki Mfg. Co.

The capillary possessed a diameter of 1 mm and a length of 10 mm with no flow-in angle, and the temperature of the atmosphere at the outlet of the capillary was maintained constant by using a heat-retaining chamber.

The melt viscosity ratio was that of the viscosity when 5 minutes have passed after the resin was thrown into the barrel and at a piston speed of 1 mm/min (shearing rate of 12.16/sec) to the viscosity at a piston speed of 100 mm/min (shearing rate of 1216/sec).

The melt viscosity and dieswell were measured at a shearing rate of 1216/sec. when 5 minutes have passed after the resin was thrown into the barrel.

The melt tension was measured at a piston speed of 5 mm/min and a take-up speed of 30 m/min, and the distance from the outlet of the capillary to the load cell pulley was 400 mm.

(2) Maximum stable film-forming speed

By using a T-die extruder, the resin was drawn between the cooling drum and the nip roll at drawing speeds of 30, 50, 70, 100, 150 m/min to prepare cast films, and a maximum speed at which the film could be stably prepared was regarded to be a maximum stable film-forming speed. Stable stands for a state in which the ratio of the width of the resin film that is obtained to the width of selvage deviation is smaller than 1% and the drop (dripping) of the molten resin from the die during the extrusion is not observed by eyes.

(3) Polydispersion degree

Polydispersion degree was measured by the Relative method using GPC. Hyper GPC arrengement HLC-8120GPC type produced by Tosoh Co. Was used as a main body of GPC, and two of TSK gel Super HM-H produced by Tosoh Co. Were connected to the main body.

5 mg of the sample was dissolved in 0.3 ml of hexafluoroisopropanol (HFIP). The resulting mixture was added 4 ml of chloroform, and then sufficiently stirred to obtain a sample solution. Chloroform was used as the carrier solvent. Under the condition of measuring temperature: 40° C., flow rate: 0.6 ml/min, a differential refractometric detector was used to obtain a elution curve. Mw, Mn were obtained from the measuring line prepared in advance from the polystyrene of which molecular weight have known, using the same solvent. Polydispersion degree (d) was calculated by using the obtained Mw, Mn, according to the following formula (2), $$d = Mw/Mn \quad (2)$$

When the sample is a blended resin, peak separation is not carried out for each component, and polydispersion degree was calculated by assuming the whole blended resin as one component.

(4) Can production testing

Examples 8–13, Examples 16–17, Comparative Examples 8–14, Comparative Examples 17–19

A petrolatum was applied onto a coated aluminum plate, a disk 152 mm in diameter was punched, and a shallow-draw formed cup was obtained according to a customary method. The draw ratio in the drawing step was 1.65. The draw-formed cup was then subjected to the primary and secondary redraw working to reduce the thickness.

| Primary redraw ratio | 1.18 |
|---|---|
| Secondary redraw ratio | 1.18 |

The thus obtained deep-draw formed cups exhibited the following properties:

| Diameter of cup | 66 mm |
|---|---|
| Height of cup | 127 mm |
| Change in the thickness of the side wall | −55% (with respect to the blank thickness) |

The draw-formed cup was subjected to the doming according to a customary manner and was heat-treated at 240° C. in order to relax internal stress of resin. Thereafter, the edge of the opening was trimmed, printing was effected on the curved surface, and flanging was effected to prepare a 350 g two-piece can. Occurrence of any abnormal condition was observed by eyes during the production of the cans and on the resin coating layer.

Examples 14–15, Comparative Examples 15–16

A wax type lubricant was applied onto the coated metal plate, a disk 158 mm in diameter was punched such that the white surface was on the outer side of the can, and a shallow-draw formed cup was obtained. The shallow-draw formed cup was subjected to the redraw-ironing working to obtain a deep-draw ironed cup.

The deep-draw formed cup exhibited the following properties:

| Diameter of cup | 52 mm |
|---|---|
| Height of cup | 140 mm |
| Thickness of can wall with respect to the blank thickness | 73% |
| Thickness of flange with respect to the blank thickness | 85% |

The deep-draw ironed cup was subjected to the doming according to a customary manner and was heat-treated at 220° C. Then, the cup was left to cool, the edge at the opening was trimmed, printing was effected on the curved surface followed by firing and drying. Therefore, necking, flanging and circumferential polyhedral wall working were effected to obtain a 250 g seamless can. The circumferentially polyhedral wall is shown in FIGS. 12 and 13.

Minimum constituent unit surfaces were consecutively formed in a number of nine in the circumferential direction to include the center of the height of the container, maintaining a width of 60 mm with a difference of one-half phase in the axial direction of the container, in a manner that L/W was 0.96, depth ratio d1/d0 was 0.95, and curvature R of dent of the constituent unit surface was 5t.

(5) Dent ERV (enamel rater value) testing

The bottom of the can was cut out, its inner surface was brought into contact with a silicone rubber of a thickness of 3 mm and a hardness of 50 at room temperature under humid condition, a steel ball of a diameter of ⅝ inches was placed on the side of the outer surface thereof, and a weight of 1 kg was permitted to fall from a height of 40 mm to effect the shock projection.

The degree of resin film cracking at the shock worked portion was measured by applying a voltage of 6.30 V. Six measurements were averaged.

Cans filled with water were stored for one week in an atmosphere of 37° C. and were subjected to the above-mentioned testing to evaluate them on the following basis.

| Evaluation | |
|---|---|
| Average current ≦ 0.050 mA | ⊚ |
| 0.050 mA < average current ≦ 0.100 mA | ○ |
| 0.100 mA < average current | X |

(6) Wrap-seaming workability testing

The cans were filled with the water at a temperature of 5° C. and a closure was wrap-seamed. Thereafter, take-off closures soon, cracks of the film at the neck and flange portions were observed by eyes.

(7) Storage testing

Examples 8–13, Examples 16–17, Comparative Examples 8–14, Comparative Examples 17–19

A steel rod of a diameter of 10 mm was placed at the bottom radius portion of a can filled with Aquarius (trademark) at 5° C., and a weight of 500 g was permitted to fall from a height of 60 mm to impart a shock. The cans were stored at room temperature. After one year has passed, the inner surfaces of the cans and leakage were checked. When those of the resin was of a multulayer structure, and with no abnormal condition, taste was examined by drinking the content (by 20 testing persons).

Examples 14–15, Comparative Examples 15–16

After filled with a sports drink at 90° C., the cans were sufficiently cooled. Thereafter, the cans were permitted to fall at 5° C. from a height of 50 cm such that the bottom collided with a stainless steel wedge (at an angle of 15°) placed on a concrete floor. The cans were then stored at 37° C. for one year to observe the corrosion at the shocked portion of the cans and at the ridges inside the cans.

(8) Melting point (Tm), glass transition temperature (Tg), ester interchange ratio A differential thermal scanning calorimeter DSC7 (manufactured by Perkin-Elmer Co.) was used. In the case of multilayer structure resin of laminate and cans, a value was measured when a single layer laminate and cans were formed with same condition using each composition. About 5 mg of a sample was maintained in a molten state at a temperature higher by 30° C. than the melting point of the resin for 3 minutes in a nitrogen stream and was quickly cooled down to 0° C. at a rate of 500° C./min. Then, measurement was taken while raising the temperature at a rate of 10° C./min. A maximum temperature of endothermic peak based on the fusion of crystals is denoted by Tm, and a changing point of specific heat based on the glass transition is denoted by Tg.

An ester interchange ratio (E) was defined in compliance with the above-mentioned formula (3) based on the measured melting point (Tm) of the polyester segment (I) in the blended resin and melting point (Tm0) of the polyester segment (I) in the non-blended state.

(9) Intrinsic viscosity (IV)

The separated film was dissolved in a mixture solvent of phenol and tetrachloroethane at a weight ratio of 1:1 at 120° C. for 10 minutes with stirring, to measure the intrinsic viscosity at 30° C. based on the capillary method and calculated by the following formula. When the resin layer was of a multi-layer structure, the layers were not separated and the viscosity of the whole layers was measured.

$$[\eta]=[(-1+\sqrt{1+4K'\eta_{sp}})/2K'C](dl/g)$$

wherein

K': Huggins' coefficient (=0.33)

C: concentration (g/100 ml)

$\eta_{sp}$: Specific viscosity

[=(falling time of solution–falling time of solvent)/falling time of solvent]

The intrinsic viscosities of the can bottom were measured before and after the heat treatment that was effected in order to remove distortion in the can production testing, and a change thereof was regarded to be a rough indication of the decomposition of the resin by the heat treatment.

(10) Density

Measured according to the density-gradient tube method by using a density-gradient tube of the type of water-calcium nitrate or of the type of n-heptane-carbon tetrachloride.

The density ($\rho$) of the separated film was found by the density-gradient tube method. The density of the sample obtained by maintaining the resin in a molten state at a temperature higher by 30° C. than Tm for 3 minutes and putting it into liquid nitrogen to quench it, was defined to be an amorphous density ($\rho$a).

(11) Birefringence

Squares of a side of 5 mm were cut out from the center of the laminate and from the center of the bottom of the can, and were separated. Predetermined positions of the samples were buried in the epoxy resin. The laminated film and the film on the bottom of the can were cut in parallel with the direction of the thickness. Retardation was measured by using a polarization microscope, and birefringence was calculated.

(12) Separation of film from the laminate and from the cans

Square of a side of 5 mm were cut out from the center of laminate and from the center of the bottom of the cans. The aluminum bases were dissolved in an 7% hydrochloric acid solution, and the steel bases were dissolved in an 18% hydrochloric acid solution to separate the resin. After washed with water to a sufficient degree, the samples were dried in vacuum.

Example 1

A resin of a composition shown in Table 1 was fed into a 65 mm$\phi$ extruder equipped with an extrusion film-forming facility, melt-extruded at a resin temperature shown in Table 1 maintaining a thickness of 20 $\mu$m, and was drawn between the cooling drum and the nip roll to obtain a cast film.

A maximum stable lamination speed testing was conducted to evaluate unstabilizing factors. Table 1 shows the results of evaluation and properties of the resin. Necking was small, and the film could be stably formed up to a speed of 150 m/min.

Example 2

The procedure was carried out in the same manner as in Example 1 but using a polyester resin constituted as shown in Table 1 under the working conditions as shown in Table 1. Table 1 shows the results of evaluation. Necking was small, and the film could be stably formed up to 150 m/min.

Example 3

Use was made of the polyester resin constituted as shown in Table 1 and working conditions as shown in Table 1. The blend contained the components (A) and (B). In other respects, the procedure was conducted in the same manner as in Example 1. Table 1 shows the results of evaluation. Necking was small, and the film could be stably formed up to 150 m/min.

Example 4

Use was made of the polyester resin constituted as shown in Table 1 and working conditions as shown in Table 1. This was the case where [$\eta$] was low in Example 3. In other respects, the procedure was conducted in the same manner as in Example 1. Table 1 shows the results of evaluation. The film could be stably formed up to 120 m/min, but selvage deviated at 150 m/min.

Example 5

Use was made of the polyester resin constituted as shown in Table 1 and working conditions as shown in Table 1. Two-layer film was formed with the resin of Example 3 as a lower layer and PET/IA12 as a surface layer. In other respects, the procedure was conducted in the same manner as in Example 1. Table 1 shows the results of evaluation. Necking was slightly larger than that of Example 3, but the film could be stably formed up to 150 m/min.

Example 6

Use was made of the polyester resin constituted as shown in Table 1 and working conditions as shown in Table 1. No crosslinking component was contained. In other respects, the procedure was conducted in the same manner as in Example 1. Table 1 shows the results of evaluation. The film could be stably formed up to 100 m/min, but selvage deviated at speeds higher than 120 m/min.

Example 7

Use was made of the polyester resin constituted as shown in Table 1 and working conditions as shown in Table 1. This was the case where the surface layer of Example 6 was composed of an NDC copolymerized resin. In other respects, the procedure was conducted in the same manner as in Example 1. Table 1 shows the results of evaluation. The film could be stably formed up to 100 m/min, but selvage deviated at speeds higher than 120 m/min.

Comparative Example 1

Use was made of the polyester resin constituted as shown in Table 1 and working conditions as shown in Table 1. This was the case where an ordinary PET was used. In other respects, the procedure was conducted in the same manner as in Example 1. Table 1 shows the results of evaluation. Selvage started deviating at 30 m/min, and the film traveled in a zigzag manner to a conspicuous degree at a higher lamination speed. The resin was not sufficiently melted at 260° C. and could not be melt-extruded. At 280° C., the selvage deviated more vigorously than at 270° C.

Comparative Example 2

Use was made of the polyester resin constituted as shown in Table 1 and working conditions as shown in Table 1. This was the case where an ordinary PET/IA was used. In other respects, the procedure was conducted in the same manner as in Example 1. Table 1 shows the results of evaluation. Selvage started deviating at 50 m/min, and the film traveled in a zigzag manner to a conspicuous degree at a higher lamination speed.

Comparative Example 3

Procedure was carried out in the same manner as in Example 1 but using the polyester resin constituted as shown in Table 1 and working conditions as shown in Table 1.

Table 1 shows the results of evaluation. This resin corresponds to the one of Comparative Example 2 of which the molecular weight is increased. The melt viscosity ratio increased but was not enough. At a speed higher than 70 m/min, selvage deviated to a large extent. When it was attempted to extrude the resin at 270° C., a very large load was exerted on the motor making it difficult to effect the extrusion. Even when it was attempted to improve the extrusion by increasing the IV, limitation was imposed due to the resin composition.

Comparative Example 4

Use was made of the polyester resin constituted as shown in Table 1 and working conditions as shown in Table 1. This was the case where the working conditions of Example 2 were changed. In other respects, the procedure was conducted in the same manner as in Example 1. Table 1 shows the results of evaluation. The melt viscosity was large, and the screw torque was excessively great. Furthermore, the melt tension was so high that the film was cut at a speed of 70 m/min.

Comparative Example 5

Use was made of the polyester resin constituted as shown in Table 1 and working conditions as shown in Table 1. This was the case where the working conditions of Example 3 were changed. In other respects, the procedure was conducted in the same manner as in Example 1. Table 1 shows the results of evaluation. The melt viscosity ratio and the melt tension were so low that the selvage deviated to a large extent despite of a small amount of residence. Deviation of selvage was observed even at 30 m/min.

Comparative Example 6

Use was made of the polyester resin constituted as shown in Table 1 and working conditions as shown in Table 1. This was the case where the working conditions of Example 3 were changed. In other respects, the procedure was conducted in the same manner as in Example 1. Table 1 shows the results of evaluation. Since the working temperature was raised to be higher than that of Comparative Example 5, the melt viscosity decreased conspicuously and the resin dripped from the T-die. The film could not be formed.

Comparative Example 7

Use was made of the polyester resin constituted as shown in Table 1 and working conditions as shown in Table 1. This was the case where the ester interchange ratio of Example 3 was changed in the step of pelletization. In other respects, the procedure was conducted in the same manner as in Example 1. Table 1 shows the results of evaluation. Necking was larger than that of Example 5, and the selvage was great at both ends of the film. The obtained film possessed a narrow flat portion. Therefore, only narrow portion could be used, and the yield was low.

Example 8

The resin of a composition shown in Table 2 was dry-blended with an antioxidant shown in Table 2, and was supplied into a 65 mmφ extruder equipped with an extrusion lamination facility, and was melt-extruded maintaining a thickness of 20 μm, and was laminated onto one surface of an aluminum alloy plate (A3004H39) having a thickness of 0.260 mm heated at 250° C. The same resin component was also fed into a 65 mmφ extruder equipped with the extrusion lamination facility and was melt-extruded maintaining a thickness of 20 μm while heating the aluminum alloy plate at a temperature lower by 30° C. than the melting point of the resin, and was laminated onto the other surface of the aluminum alloy plate. The obtained coated aluminum plate was put to the can production testing and was evaluated. The resin was also measured for its ester interchange ratio in the state of a coated aluminum plate. The resin that was used was the same as the resin mentioned in Example 3. The can was put to the dent ERV testing, wrap-seaming workability testing and storage testing to evaluate. Table 2 shows the properties of the can and the results of evaluation. No problem occurred by the addition of the antioxidant, and there was no change in the [η] of the resin of can bottom before and after the heat treatment. The results of can production and dent ERV testing were favorable, and the state of the can and the content after the storage testing were normal.

Example 9

The procedure was carried out in the same manner as in Example 8 but using the polyester resin constituted as shown in Table 2 and the antioxidant shown in Table 2.

This was the case where the amount of the antioxidant of Example 8 was increased.

Table 2 shows the properties of the can and the results of evaluation. No problem occurred by the addition of the antioxidant, and there was no change in the [η] of the resin before and after the heat treatment. The results of can production and dent ERV testing were favorable, and the state of the can and the content after the storage testing were normal.

Example 10

The resin was co-extruded by using two extruders and a two-layer die to form a resin film of two-layer structure. The thickness ratio of the surface layer and the lower layer was 1:1. The layers possessed constitutions as shown in Table 2; i.e., the surface layer contained no antioxidant but the lower layer only contained the antioxidant. In other respects, the laminate was the same as that of Example 8. The resin was the same as the one described in Example 5.

Table 2 shows the properties of the can and the results of evaluation. No problem occurred by the addition of the antioxidant, but [η] decreased by a small amount due to the heat treatment. However, the results of can production and dent ERV testing were favorable, and the state of the can and the content after the storage testing were normal.

Example 11

The procedure was carried out in the same manner as in Example 8 but using the polyester resin constituted as shown in Table 2 and the antioxidant shown in Table 2.

This was the case where the kind of the antioxidant of Example 8 was increased.

Table 2 shows the properties of the can and the results of evaluation. No problem occurred by the addition of the antioxidant, and there was no change in the [η] of the resin before and after the heat treatment. The results of can production and dent ERV testing were favorable, and the state of the can and the content after the storage testing were normal.

Example 12

The resin was co-extruded by using two extruders and a two-layer die to form a resin film of two-layer structure. The thickness ratio of the surface layer and the lower layer was 1:1. The layers possessed constitutions as shown in Table 2; i.e., the surface layer contained no antioxidant but the lower layer only contained the antioxidant. In other respects, the laminate was the same as that of Example 8. This was the case where the kind of the antioxidant of Example 10 was changed.

Table 2 shows the properties of the can and the results of evaluation. No problem occurred by the addition of the antioxidant, but [η] decreased by a small amount due to the heat treatment. However, the results of can production and dent ERV testing were favorable, and the state of the can and the content after the storage testing were normal.

Example 13

The resin was co-extruded by using two extruders and a two-layer die to form a resin film of two-layer structure. The thickness ratio of the surface layer and the lower layer was 1:1. Each layer was an undrawn film comprised of a polyester resin constituted as shown in Table 2 and the antioxidant shown in Table 2, and was drawn through a T-die maintaining a total thickness of 20 μm. The aluminum plate was heated at a temperature higher by 30° C. than the melting point of the resin, and the film was heat-laminated thereon to obtain a coated aluminum plate.

Thereafter, the can was formed in the same manner as that of Example 8. This was the case where the direct resin coating method by the extrusion-coating of Example 8 was replaced by a method of coating after the resin was formed into an undrawn film.

Table 2 shows the properties of the can and the results of evaluation. No problem occurred by the addition of the antioxidant, and [η] of the resin changed very little before and after the heat treatment. Excellent shock resistance was obtained, and the state of the can and the content after the storage testing were normal.

Example 14

A cast film was formed comprising a surface layer of a polyester resin of 100 mol % of an ethylene glycol, 88 mol % of a terephthalic acid and 12 mol % of an isophthalic acid, and a lower layer of a polyester resin (I) of 100 mol % of an ethylene glycol, 94 mol % of a terephthalic acid and 6 mol % of an isophthalic acid, a polyester resin (II) of 100 mol % of a butylene glycol and 100 mol % of a terephthalic acid, and a polyester resin (III) of 100 mol % of a butylene glycol and 100 mol % of an adipic acid at a weight ratio (I):(II):(III) of (70):(24):(6) and further containing an antioxidant (trade name: Irganox 1010) in an amount of 0.1 wt % with respect to the lower layer composition (blend of component (A) and (B)), by using a two-layer die at a resin temperature of 260° C. maintaining a thickness of about 230 μm (thickness ratio of 1 (surface layer):4 (lower layer)). The cast film was quickly quenched by using the cooling drum and was, then, preheated to obtain a biaxially drawn film by an ordinary method. The drawing ratio was 3.0 times in the longitudinal direction and 3.1 times in the transverse direction, and the heat-setting temperature was 180° C. The obtained film possessed a thickness of 25 μm (surface layer 5 μm, lower layer 20 μm).

Thereafter, the above biaxially drawn film was laminated onto one surface of a TFS steel plate (thickness of 0.195 mm, amount of metal chromium of 110 mg/m², amount of chromium oxide hydrate of 15 mg/m²), and onto the other surface thereof was further simultaneously laminated a film of a thickness of 13 μm obtained by biaxially drawing a white copolymerized polyester resin comprising a polyester resin of 12 mol % of isophthalic acid, 88 mol % of terephthalic acid and 100 mol % of ethylene glycol, and, as a pigment, 20% by weight of titanium oxide, at a plate temperature of 240° C., a laminate roll temperature of 150° C. and a plate-moving speed of 40 m/min, immediately followed by cooling with water to obtain a laminated metal plate.

A wax type lubricant was applied to this coated metal plate, a disk 158 mm in diameter was punched so that the white surface was on the outer side, and a shallow-draw formed cup was obtained. The shallow-draw formed cup was subjected to the redraw-ironing working to obtain a deep-draw ironed cup.

The deep-draw formed cup possessed the following properties.

| | |
|---|---|
| Diameter of cup | 52 mm |
| Height of cup | 140 mm |
| Thickness of the wall to the blank thickness | 73% |
| Thickness of flange to the blank thickness | 85% |

The deep-draw ironed cup was subjected to the doming according to a customary manner and was heat-treated at 220° C. Then, the cup was left to cool, the edge at the opening was trimmed, printing was effected on the curved surface followed by firing and drying. Therefore, necking, flanging and circumferential polyhedral wall working were effected to obtain a 250 g seamless can. The circumferentially polyhedral wall is shown in FIGS. 12 and 13.

Minimum constituent unit surfaces were consecutively formed in a number of nine in the circumferential direction to include the center of the height of the container, maintaining a width of 60 mm with a difference of one-half phase in the axial direction of the container, in a manner that L/W was 0.96, depth ratio d1/d0 was 0.95, and curvature R of dent of the constituent unit surface was 5t. Then, after filled with a sports drink at 90° C., the cans were sufficiently cooled. Thereafter, the cans were permitted to fall at 5° C. from a height of 50 cm such that the bottom collided with a stainless steel wedge (at an angle of 15°) placed on a concrete floor. The cans were then stored at 37° C. for one year to observe the corrosion at the shocked portion of the cans and at the ridges inside the cans.

Analysis of the film indicated an ester interchange ratio of 5.1%. And the birefringence of the laminate and the can bottom was followa;

Laminate Δn1: 0.030, Δn2: 0.030, Δn3: <0.005

Can bottom Δn1: 0.040, Δn2: 0.035, Δn3: <0.005

Table 2 shows the properties of the film and the results of evaluation. Denting testing, wrap-seaming. Denting testing and wrap-seaming workability testing were favorable, and no corrosion took place after the storage testing.

Example 15

A cast film was formed comprising a surface layer of a polyester resin of 100 mol % of an ethylene glycol, 88 mol % of a terephthalic acid and 12 mol % of a naphthalene 2,6-dicarboxylic acid, and a lower layer of a polyester resin (I) of 100 mol % of an ethylene glycol, 94 mol % of a terephthalic acid and 6 mol % of an isophthalic acid, a polyester resin (II) of 100 mol % of a butylene glycol and 100 mol % of a terephthalic acid, and a polyester resin (III) of 100 mol % of a butylene glycol and 100 mol % of an adipic acid at a weight ratio (I):(II):(III) of (70):(24):(6) and further containing an antioxidant (trade name: Irganox 1010) in an amount of 0.1 wt % with respect to the lower layer composition (blend of component (A) and (B)), by using a two-layer die at a resin temperature of 270° C. maintaining a thickness of about 230 μm (thickness ratio of 1 (surface layer):4 (lower layer)). In other respects, the film was biaxially drawn, a laminat was formed, a can was produced, and the corrosion testing was conducted in the same manner as in Example 14.

Analysis of the film indicated an ester interchange ratio of 3.2%. And the birefringence of the laminate and the can bottom was follows;

Laminate Δn1: 0.030, Δn2: 0.035, Δn3: <0.005

Can bottom Δn1: 0.040, Δn2: 0.040, Δn3: <0.005

Table 2 shows the properties of the film and the results of evaluation. Denting testing and wrap-seaming workability testing were favorable, and no corrosion took place after the storage testing.

Comparative Example 8

The procedure was carried out in the same manner as in Example 8 using the polyester resin constituted as shown in Table 2 but without adding antioxidant. This was the case for demonstrating the shock resistance of PET/IA.

Table 2 shows the characteristics of the cans and the results of evaluation. Though [η] of the resin was not much decreased upon the heat treatment, the resin lost shock resistance. During the production of the cans, whitening was observed in the upper part of the can barrel in about 10% of the cans. After the storage testing, dented portions of the cans corroded conspicuously and leakage was observed in some of the cans.

Comparative Example 9

The procedure was carried out in the same manner as in Example 8 but using the polyester resin constituted as shown in Table 2 and the antioxidant shown in Table 2. This was the case where the antioxidant was added to Comparative Example 8.

Table 2 shows the characteristics of the cans and the results of evaluation. Though [η] of the resin was not much decreased upon the heat treatment like in Comparative Example 8, the resin has lost shock resistance, proving that the properties were not improved by the addition of the antioxidant. During the production of the cans, whitening was observed in the upper part of the can barrel in about 10% of the cans. After the storage testing, dented portions of the cans corroded conspicuously and leakage was observed in some of the cans.

Comparative Example 10

The procedure was carried out in the same manner as in Example 8 using the polyester resin constituted as shown in Table 2 but without adding antioxidant. This was the case where the antioxidant was not added to Example 8.

Table 2 shows the characteristics of the cans and the results of evaluation. Though there was no problem in the production of the cans, [η] of the resin was greatly decreased upon the heat treatment and the shock resistance was poor. After the storage testing, dented portions of the cans corroded conspicuously and leakage was observed in some of the cans.

Comparative Example 11

The procedure was carried out in the same manner as in Example 8 but using the polyester resin constituted as shown in Table 2 and the antioxidant shown in Table 2. This was the case where the kind of the antioxidant was changed in Example 8.

Table 2 shows the characteristics of the cans and the results of evaluation. Offensive odor was produced at the time of extrusion due to the addition of the antioxidant, and the resin was discolored conspicuously. It was determined that the laminate could not be used for producing the containers and, hence, the can production testing, dent ERV testing and storage testing were not conducted.

Comparative Example 12

The procedure was carried out in the same manner as in Example 8 but using the polyester resin constituted as shown in Table 2 and the antioxidant shown in Table 2. This was the case where the kind of the antioxidant was changed in Example 8.

Table 2 shows the characteristics of the cans and the results of evaluation. Though no problem occurred by the addition of the antioxidant, the effect of the antioxidant was small, [η] of the resin was greatly decreased upon the heat treatment, and the resin has lost shock resistance. This was because, the antioxidant possessed such a small molecular weight that it has volatilized during the preparation of film by extrusion. After the storage testing, dented portions of the cans corroded conspicuously and leakage was observed in some of the cans.

Comparative Examples 13

The procedure was carried out in the same manner as in Example 8 but using the polyester resin constituted as shown in Table 2 and the antioxidant shown in Table 2. This was the case where the amount of the antioxidant was increased in Example 8.

Table 2 shows the characteristics of the cans and the results of evaluation. Gel lumps were formed much during the extrusion due to the addition of the antioxidant, and the surface of laminate exhibited coarse surfaces. [η] was not decreased upon the heat treatment and excellent shock resistance was exhibited. When the cans were produced, however, the barrel was frequently broken due to coarse surfaces. Since the cans were not obtained in a required number, the storage testing was not conducted.

Comparative Example 14

The procedure was carried out in the same manner as in Example 8 but using the polyester resin constituted as shown in Table 2 and the antioxidant shown in Table 2. This was the case where the resin of the surface layer was changed in Example 10.

The cans were put to the dent ERV testing and storage testing to evaluate. Table 2 shows the characteristics of the cans and the results of evaluation. No problem occurred due to the addition of the antioxidant, and there was no change in the [η] of the resin before and after the heat treatment. The results of can production and dent ERV testing were favorable. After the storage testing, however, the taste of the content has changed so greatly that it was no longer drinkable.

Comparative Example 15

The same resin and the same constitution as those of Example 14 were extruded while extending the residence time in the extruder so that the ester interchange reaction was sufficiently carried out. In other respects, the film was biaxially drawn, the laminate was formed, the cans were produced and the corrosion testing was conducted in the same manner as in Example 14.

Analysis of the film indicated an ester interchange ratio of 23.2%. And the birefringence of the laminate and the can bottom was follows;

Laminate Δn1: 0.045, Δn2: <0.005, Δn3: <0.005

Can bottom Δn1: 0.060, Δn2: <0.005, Δn3: <0.005

Table 2 shows the properties of the film and the results of evaluation.

During the forming, the film partly cracked on the inside, and after the heat-treatment, the surface of the film of the inside wrinkled. The results of the denting testing were poor, and it was determined that the cans were not practicable.

Comparative Example 16

The film was biaxially drawn, the laminate was formed, and the cans were produced and evaluated in the same manner as in Example 14 except that the polyester resin of the lower layer of Example 14 was comprised of the components (I):(II):(III)=(20):(64):(16).

Analysis of the film indicated an ester interchange ratio of 4.8%. And the birefringence of the laminate and the can bottom was follows;

Laminate Δn1: 0.030, Δn2: 0.030, Δn3: <0.005

Can bottom Δn1: 0.040, Δn2: 0.030, Δn3: <0.005

Table 2 shows the properties of the film and the results of evaluation. Though wrap-seaming workability testing was favorable, the ridges of the circumferentially polyhedral portions partly corroded, film was cracked at the shocked portions, the corrosion was so conspicuous that it was determined that the cans were not practically usable.

Example 16

A laminate was prepared by using the resin described in Example 1 in the same manner as in Example 8, and was readily cooled. A can produced by using this laminate was filled with water, and to which a closure was wrap-seamed. Table 3 shows the density of the laminate, state of extrusion at 150 m/min, barrel-forming workability and wrap-seam workability. High-speed extrusion coating could be stably carried out, and there was no problem in the barrel-forming and wrap-seaming workability. The state of the can after the packaging was normal.

Example 17

A laminate was prepared by using the resin described in Example 3 in the same manner as in Example 10, and was readily cooled. A can produced by using this laminate was filled with water, and to which a closure was wrap-seamed. Table 3 shows the density of the laminate, state of extrusion at 150 m/min, barrel-forming workability and wrap-seam workability. High-speed extrusion coating could be stably carried out, and there was no problem in the barrel-forming and wrap-seaming workability. The state of the can after the packaging was normal.

Comparative Example 17

A laminate was prepared by using the resin described in Example 1 in the same manner as in Example 8, and was naturally cooled. A can produced by using this laminate was filled with water, and to which a closure was wrap-seamed. This was the case where the crystalline state of the resin layer of the laminate of Example 16 was changed. Table 3 shows the density of the laminate, state of extrusion at 150 m/min, barrel-forming workability and wrap-seam workability. High-speed extrusion coating could be stably carried out. However, peeling and cracking occurred in nearly one-half number of the cans during the shallow-draw forming of the cups, and the film peeled in all cups during the primary redrawing. Wrap-seaming could not be carried out.

Comparative Example 18

A laminate was prepared by using the resin shown in Table 3 in the same manner as in Example 10, and was naturally cooled. In other respects, the procedure was carried out in the same manner as in Example 17. This was the case where the polyfunctional component was not used in Example 17. Table 3 shows the density of the laminate, state of extrusion at 150 m/min, barrel-forming workability and wrap-seam workability. The selvage deviated slightly at the time of high-speed extrusion coating, and the thickness of the film was irregular on the laminate. Wrinkles have developed and thickness has varied during the formation of the barrel, and the barrel was broken in about 20% of the cans. The neck was wrinkled and buckled, and the flange of the metal base often cracked during the wrap-seaming.

Comparative Example 19

A laminate was prepared by using the resin described in Example 3 in the same manner as in Example 10, and was naturally cooled. In other respects, the procedure was carried out in the same manner as in Example 17. This was the case where the crystalline state of the resin layer of the laminate was changed in Example 17. Table 3 shows the density of the laminate, state of extrusion at 150 m/min, barrel-forming workability and wrap-seam workability. A high-speed extrusion coating could be stably carried out. Barrel could be formed without any trouble. However, the resin has peeled off the flange portion during the wrap-seaming.

According to the present invention, an extrusion-coated layer of a polyester or a thermally-adhering film is formed on the base material such as of a metal by using a polyester having particular melt-viscous properties, making it possible to obtain a laminate having a uniform and complete coating, featuring excellent adhesiveness and workability, cheaply, maintaining good yield and at high speeds.

By using a polyester of a particular composition, furthermore, shock resistance is improved and, particularly, dent resistance is markedly improved, suppressing the film from becoming brittle due to the crystallization despite of a high degree of draw working, ironing working, or heat treatment during or after the production of cans, making it possible to provide a metal-polyester laminate maintaining excellent dent resistance and to provide seamless containers made of this laminate.

Upon combining the polyester with a particular antioxidant, furthermore, it is made possible to provide a polyester-metal laminate with markedly improved dent resistance after having received thermal hysteresis at high temperatures and to provide seamless containers made of this laminate.

Owing to the above-mentioned excellent properties, the laminate of the present invention is useful for the production of ordinary draw-formed cups, can closures, crowns and caps. Moreover, the composite film is also useful as a general packaging material.

TABLE 1

Composition and constitution of resin layer

| | | Lower Layer | | | | | | | | |
|---|---|---|---|---|---|---|---|---|---|---|
| | | Component [I] | | | Component | | Ester | | | Thickness |
| | Surface layer | Main component | Poly-functional component | Polyfunctional component concentration (mol %) | Component [II] | Component [III] | ratio [I]:[II]:[III] (wt. ratio) | interchange ratio (pellet) | [η] | (surface layer/lower layer) |
| Ex.1 | single layer | PET/IA12 | PEOH | 0.35 | no blend system | | 100:0:0 | — | 0.71 | — |
| Ex.2 | single layer | PET/EOBPA10 | none | | no blend system | | 100:0:0 | — | 0.91 | — |
| Ex.3 | single layer | PET/IA12 | PEOH | 0.35 | PBT | PBA | 50:37.5:12.5 | 1.0 | 0.94 | — |
| Ex.4 | single layer | PET/IA12 | PEOH | 0.35 | PBT | PBA | 50:37.5:12.5 | 1.8 | 0.68 | — |
| Ex.5 | PET/IA12 | PET/IA12 | PEOH | 0.35 | PBT | PBA | 50:37.5:12.5 | 1.0 | 0.94 | 7.5/7.5 |
| Ex.6 | PET/IA12 | PET/IA6 | none | | PBT | PBA | 70:24:6 | 5.1 | 0.66 | 5/20 |
| Ex.7 | PET/NDC12 | PET/IA6 | none | | PBT | PBA | 70:24:6 | 3.2 | 0.66 | 5/20 |
| Co.Ex.1 | single layer | PET | none | | no blend system | | 100:0:0 | — | 0.75 | — |
| Co.Ex.2 | single layer | PET/IA12 | none | | no blend system | | 100:0:0 | — | 0.62 | — |
| Co.Ex.3 | single layer | PET/IA12 | none | | no blend system | | 100:0:0 | — | 0.80 | — |
| Co.Ex.4 | single layer | PET/EOBPA10 | none | | no blend system | | 100:0:0 | — | 0.91 | — |
| Co.Ex.5 | single layer | PET/IA12 | PEOH | 0.35 | PBT | PBA | 50:37.5:12.5 | 1.0 | 0.94 | — |
| Co.Ex.6 | single layer | PET/IA12 | PEOH | 0.35 | PBT | PBA | 50:37.5:12.5 | 1.0 | 0.94 | — |
| Co.Ex.7 | single layer | PET/IA12 | PEOH | 0.35 | PBT | PBA | 50:37.5:12.5 | 30 | 0.94 | — |

PET/IA12: Isophthalic acid 12 mol % copolymerized PET
PET/IA6: Isophthalic acid 6 mol % copolymerized PET
PET/EOBPA10: Disphenol A ethylene oxide adduct 10 mol % copolymerized PET
PET/NDC12: Naphthalene dicarboxylic acid 12 mol % copolymerized PET
PBT: Polybutylene terephthalate
PBA: Polybutylene adipate
PEOH: Pentaerythritol

| | Melt properties | | | | | | Extrusion properties | |
|---|---|---|---|---|---|---|---|---|
| | Extruded resin temp. (° C.) | Melt viscosity ratio (R) | Melt viscosity (poise) @ 1216/s | Melt tension (g) | dies-well | Poly-dispersion (Mw/Mn) | Max. stable lamination speed | Remarks |
| Ex.1 | 270 | 4.5 | 784 | 0.61 | 1.62 | 4.5 | 150 | |
| Ex.2 | 300 | 3.0 | 1106 | 0.48 | 1.33 | 3.1 | 150 | |
| Ex.3 | 260 | 2.9 | 2080 | 0.60 | 1.87 | 4.0 | 150 | |
| Ex.4 | 270 | 2.6 | 1120 | 0.32 | 1.55 | 3.0 | 120 | |
| Ex.5 | 260 | 2.9 | 2080 | 0.60 | 1.87 | 3.5 | 150 | slightly large necking |
| Ex.6 | 260 | 2.3 | 1215 | 0.25 | 1.33 | 2.6 | 100 | slightly large necking |
| Ex.7 | 270 | 2.4 | 1008 | 0.22 | 1.35 | 2.6 | 100 | slightly large necking |
| Comp. Ex.1 | 270 | 1.6 | 1947 | 0.00 | 1.18 | 2.4 | >30 | film deviated |
| Comp. Ex.2 | 280 | 0.7 | 677 | 0.00 | 1.22 | 2.5 | 30 | film deviated |
| Comp. Ex.3 | 280 | 2.4 | 1812 | 0.01 | 1.23 | 2.6 | 50 | film deviated |
| Comp. Ex.4 | 260 | 7.8 | 4513 | 1.52 | 1.40 | 3.1 | 50 | film is cut (70 mpm) |
| Comp. Ex.5 | 280 | 7.8 | 1135 | 0.20 | 1.70 | 3.9 | >30 | film deviated by a small residence |
| Comp. Ex.6 | 300 | 8.8 | 421 | 0.00 | 1.24 | 3.7 | film not formed | dripped from T-die, film not formed |
| Comp. Ex.7 | 260 | 3.0 | 2000 | 0.48 | 1.64 | 3.2 | 80 | excess of necking |

TABLE 2

Composition and constitution of resin layer

| | | Lower layer | | | | | | | | |
|---|---|---|---|---|---|---|---|---|---|---|
| | | Surface layer | | Component [I] | | | | | Component | Ester |
| | Laminating method | Composition | Tg | Main component | Poly-functional component | Polyfunctional component concentration (mol %) | Component [II] | Component [III] | ratio [I]:[II]:[III] (wt. %) | interchange ratio (pellet) |
| Ex.8 | direct extrusion | single layer | | PET/IA12 | PEOH | 0.35 | PBT | PBA | 50:37.5:12.5 | 1.7 |
| Ex.9 | direct extrusion | single layer | | PET/IA12 | PEOH | 0.35 | PBT | PBA | 50:37.5:12.5 | 2.1 |

TABLE 2-continued

| | | | | | | | | | | |
|---|---|---|---|---|---|---|---|---|---|---|
| Ex.10 | direct extrusion | PET/IA12 | 72 | PET/IA12 | PEOH | 0.35 | PBT | PBA | 50:37.5:12.5 | 1.7 |
| Ex.11 | direct extrusion | single layer | | PET/IA12 | PEOH | 0.35 | PBT | PBA | 50:37.5:12.5 | 1.6 |
| Ex.12 | direct extrusion | PET/IA12 | 72 | PET/IA12 | PEOH | 0.35 | PBT | PBA | 50:37.5:12.5 | 1.6 |
| Ex.13 | casted, heat-laminated | PET/IA12 | 72 | PET/IA12 | PEOH | 0.35 | PBT | PBA | 50:37.5:12.5 | 1.8 |
| Ex.14 | biaxially drawn, heat-laminated | PET/IA12 | 72 | PET/IA6 | | none | PBT | PBA | 70:24:6 | 5.1 |
| Ex.15 | biaxially drawn, heat-laminated | PET/NDC12 | 83 | PET/IA6 | | none | PBT | PBA | 70:24:6 | 3.2 |
| Co.Ex.8 | direct extrusion | single layer | | PET/IA12 | PEOH | 0.35 | no blend system | | 100:0:0 | — |
| Co.Ex.9 | direct extrusion | single layer | | PET/IA12 | PEOH | 0.35 | no blend system | | 100:0:0 | — |
| Co.Ex.10 | direct extrusion | single layer | | PET/IA12 | PEOH | 0.35 | PBT | PBA | 50:37.5:12.5 | 1.4 |
| Co.Ex.11 | direct extrusion | single layer | | PET/IA12 | PEOH | 0.35 | PBT | PBA | 50:37.5:12.5 | 1.5 |
| Co.Ex.12 | direct extrusion | single layer | | PET/IA12 | PEOH | 0.35 | PBT | PBA | 50:37.5:12.5 | 1.5 |
| Co.Ex.13 | direct extrusion | single layer | | PET/IA12 | PEOH | 0.35 | PBT | PBA | 50:37.5:12.5 | 2.2 |
| Co.Ex.14 | direct extrusion | PET/AA10 | 54 | PET/IA12 | PEOH | 0.35 | PBT | PBA | 50:37.5:12.5 | 1.7 |
| Co.Ex.15 | biaxially drawn, heat-laminated | PET/IA12 | 72 | PET/IA6 | | none | PBT | PBA | 70:24:6 | 23.2 |
| Co.Ex.16 | biaxially drawn, heat-laminated | PET/IA12 | 72 | PET/IA6 | | none | PBT | PBA | 20:64:16 | 4.8 |

PET/IA12: Isophthalic acid 12 mol % copolymerized PET
PET/IA6: Isophthalic acid 6 mol % copolymerized PET
PET/EOBPA10: Bisphenol A ethylene oxide adduct 10 mol % copolymerized PET
PET/NDC12: Naphthalene dicarboxylic acid 12 mol % copolymerized PET
PET/AA10: Adipic acid 10 mol % copolymerized PET
PBT: Polybutylene terephthalate
PEOH: Penta erythritol
PBA: Polybutylene adipate Composition and constitution of resin layer

| | Lower layer Antioxidant | | | [η] | | Thickness | | Shock resistance | | | |
|---|---|---|---|---|---|---|---|---|---|---|---|
| | Kind | Amount of addition (wt. %) | Problem to due addition | Before heat treatment | After heat treatment | surface layer/lower layer | Results of can production | Dent ERV test | Filling test | Results of storage test | |
| Ex.8 | A | 0.2 | normal | 0.94 | 0.94 | — | normal | ⊙ | normal | normal | |
| Ex.9 | A | 1.2 | normal | 0.98 | 0.98 | — | normal | ⊙ | normal | normal | |
| Ex.10 | A | 0.2 | normal | 0.81 | 0.77 | 7.5/7.5 | normal | ⊙ | normal | normal | |
| Ex.11 | B | 0.2 | normal | 0.85 | 0.80 | 7.5/7.5 | normal | ⊙ | normal | normal | |
| Ex.12 | B | 0.2 | normal | 0.85 | 0.80 | 7.5/7.5 | normal | ⊙ | normal | normal | |
| Ex.13 | A | 0.2 | normal | 0.79 | 0.78 | 7.5/7.5 | normal | ⊙ | normal | normal | |
| Ex.14 | A | 0.1 | normal | 0.66 | 0.66 | 5/20 | normal | ⊙ | normal | normal | |
| Ex.15 | A | 0.1 | normal | 0.66 | 0.66 | 5/20 | normal | ⊙ | normal | normal | |
| Co.Ex.8 | | none | | 0.71 | 0.62 | — | normal | X | normal | bottom radius corroded | |
| Co.Ex.9 | A | 0.2 | normal | 0.70 | 0.68 | — | normal | X | normal | bottom radius corroded | |
| Co.Ex.10 | | none | | 0.94 | 0.45 | — | normal | X | normal | bottom radius corroded | |
| Co.Ex.11 | C | 0.3 | colored and odor | — | — | — | — | — | — | — | |
| Co.Ex.12 | D | 0.3 | normal | 0.98 | 0.54 | — | normal | X | normal | bottom radius corroded | |
| Co.Ex.13 | A | 2.0 | gelled | 0.94 | 0.94 | 7.5/7.5 | | can was not formed | | | |
| Co.Ex.14 | A | 0.2 | normal | 0.94 | 0.94 | 7.5/7.5 | normal | ⊙ | normal | abnormal taste of content | |
| Co.Ex.15 | A | 0.1 | normal | 0.66 | 0.66 | 5/20 | inner surface wrinkled | X | — | — | |
| Co.Ex.16 | A | 0.1 | normal | 0.70 | 0.70 | 5/20 | normal | X | normal | upper part of can corroded | |

A: Irganox1010 (tradename M = 1177.7)
B: tocopherol (M = 430.7),
C: Distearyi3,3'-thiodipropionate
D: BHT

TABLE 3

| | | Lower layer | | | | | | |
|---|---|---|---|---|---|---|---|---|
| | | Component [I] | | | | | Component | Thickness |
| | Surface layer | Main component | Poly-functional component | Polyfunctional component concentration (mol %) | Component [II] | Component [III] | ratio [I]:[II]:[III] (wt. ratio) | (surface layer/lower layer) |
| Ex.16 | single layer | PET/IA12 | PEOH | 0.35 | non-blend | | 100:0:0 | — |
| Ex.17 | PET/IA12 | PET/IA12 | PEOH | 0.35 | PBT | PBA | 50:37.5:12.5 | 7.5/7.5 |
| Comp. | single layer | PET/IA12 | PEOH | 0.35 | non-blend | | 100:0:0 | — |

TABLE 3-continued

| | | | | | | | | |
|---|---|---|---|---|---|---|---|---|
| Ex.17 Comp. Ex.18 | PET/IA12 | PET/IA12 | | none | | PBT | PBA | 50:37.5:12.5 | 7.5/7.5 |
| Comp. Ex.19 | PET/IA12 | PET/IA12 | PEOH | 0.35 | | PBT | PBA | 50:37.5:12.5 | 7.5/7.5 |

PET/IA12: Isophthalic acid 12 mol % copolymerized PET
PBT: Polybutylene terephthalate
PBA: Polybutylene adipate
PEOH: Pentaerythritol

| | Density | | | | | |
|---|---|---|---|---|---|---|
| | Resin layer density ρ (g/cc) | Amorphous density ρa (g/cc) | Density dirrecence ρ − ρa | Productivity @ 150 mpm | Barrel forming Property | Wrap-seaming workability |
| Ex.16 | 1.335 | 1.329 | 0.006 | ⊚ | ⊚ | normal |
| Ex.17 | 1.320 | 1.302 | 0.018 | ⊚ | ⊚ | normal |
| Comp. Ex.17 | 1.381 | 1.329 | 0.052 | ⊚ | peeled | — |
| Comp. Ex.18 | 1.321 | 1.302 | 0.019 | Δ | Δ | flange cracked |
| Comp. Ex.19 | 1.355 | 1.302 | 0.053 | ⊚ | ⊚ | peeled |

TABLE 4

| Birefringence of laminate | | | Heat treatment condition | Birefringence of laminate after heat treatment | | | Plate dent ERV (mA) |
|---|---|---|---|---|---|---|---|
| Δn1 | Δn2 | Δn3 | | Δn1 | Δn2 | Δn3 | |
| 0.015 | 0.015 | 0.005 | 220° C. × 3 min. | 0.020 | 0.020 | <0.005 | 0.025 |
| 0.030 | 0.035 | 0.005 | 220° C. × 3 min. | 0.040 | 0.045 | <0.005 | 0.003 |
| 0.040 | 0.035 | 0.005 | 220° C. × 3 min. | 0.050 | 0.045 | <0.005 | 0.002 |
| | | | 240° C. × 3 min. | <0.005 | <0.005 | <0.005 | 0.045 |

Dent ERV test: At room temperature under humid condition, a plate (inner surface side) was contacted with a silicon rubber, a steel ball of diameter of ⅝ inches was placed on its outside, and a weight of 1 kg was dropped from a height of 40 mm. Then, a film cracking was evaluated by current value at applying a voltage of 6.3 V.
Structure:
Thickness ratio (surface layer 5 μm/lower layer 20 μm)
Surface layer component (PET/IA12)
Lower layer component (I)PET/IA6 (II)PBT (III)PBA I:II:III: = 70:24:6
Ester interchange ratio of a laminate film 5.0% [η] of a laminate film 0.64
Addition of 0.1 wt % antioxidant (commercial name: irganox 1010) to lower layer
note) PET/IA12: Isophthalic acid 12 mol % copolymerized PET
PET/IA6: Isophthalic acid 6 mol % copolymerized PET
PBT: Polybutylene terephthalate
PBA: Polybutylene adipate

What is claimed is:

1. A laminate obtained by laminating a resin comprising a polyester a metal base material, said resin layer having (a) a melt viscosity ratio (R) defined by the following formula (1), $$R = \frac{\eta_{12.2}}{\eta_{1216}} \quad (1)$$

wherein $\eta_{12.2}$ is a melt viscosity at an extrusion temperature of the polyester at a shearing rate of 12.2 sec$^{-1}$, and $\eta_{1216}$ is a melt viscosity at an extrusion temperature of the polyester at a shearing rate of 1216 sec$^{-1}$,
of not smaller than 2.0 at a melt extrusion temperature of the polyester, (b) $\eta_{1216}$ of 500 to 4000 poises, and (c) a melt tension of larger than 0.2 and not larger than 1.5 grams at a temperature during the melt extrusion and said resin layer being further quickly quenched after it is melt-extruded, wherein said polyester comprises (1) terephthalic acid with (2) ethylene glycol or 1,4-butanediol, and has a melting point (Tm) of 160 to 270° C., and
the difference between the density (ρ) of the polyester layer of the laminate after extrusion and the amorphous density (ρa) is not larger than 0.05.

2. A laminate according to claim 1, wherein said resin layer has a dieswell of from 1.3 to 2.0 at the temperature during the melt-extrusion.

3. A laminate according to claim 1, wherein said resin layer has a degree of polydispersion (d) defined by the following formula (2), $$d = Mw/Mn \quad (2)$$

wherein Mw is a weight average molecular weight, and Mn is a number average molecular weight,
of not smaller than 2.5.

4. A laminate for producing cans according to claim 1, wherein a resin layer comprising a polyester composition is directly extrusion-laminated onto the metal base.

5. A laminate for producing cans according to claim 1, wherein the resin layer comprising a polyester composition is an undrawn film which is heat-adhered onto the metal base.

6. A laminate for producing cans according to claim 4 or 5, wherein the polyester composition of said resin layer contains at least one kind of branched or crosslinked component selected from the group consisting of a trifunctional or more functional polybasic acid and a polyhydric alcohol.

7. A laminate for producing cans according to claim 4 or 5, wherein a difference between the density of the polyester composition and an amorphous density is not larger than 0.05.

8. A container obtained by working a laminate for producing cans according to claim 4 or 5, wherein at least an inner surface thereof is coated with the polyester composition.

9. A laminate for producing cans according to claim 1, wherein the resin layer composed of the polyester composition is a biaxially drawn film which is heat-adhered onto the metal base.

10. A laminate for producing cans according to claim 9, wherein the polyester composition layer of the laminate using the biaxially drawn film has a birefringence ($\Delta n$) defined by the following formula (4), $$\Delta n_{1-3} = n_m - n_t \quad (4)$$

wherein $n_m$ is a refractive index of the film in the direction of a maximum orientation, and $n_t$ is a refractive index of the film in the direction of thickness thereof,
wherein, when a value on the surface of the film is denoted by $\Delta n_1$, a value at an intermediate position of the film from the surface of the layer to the metal plate is denoted by $\Delta n_2$, and a value on the side in contact with the metal plate by $\Delta n_3$, then, there is a feature in that at least one of $\Delta n_1$ or $\Delta n_2$ is not smaller than 0.02, and $\Delta n_3$ is not larger than $\Delta n_1$ or $\Delta n_2$.

11. A container obtained by working a laminate for producing cans according to claim 9 or 10, wherein at least an inner surface thereof is coated with a polyester composition.

12. A container for producing cans according to claim 11, wherein the polyester composition layer on the bottom of the container has a birefringence ($\Delta n$) defined by the following formula (4), $$\Delta n_{1-3} = n_m - n_t \quad (4)$$

wherein $n_m$ is a refractive index of the film in the direction of a maximum orientation, and $n_t$ is a refractive index of the film in the direction of thickness thereof,
wherein, when a value on the surface of the film is denoted by $\Delta n_1$, a value at an intermediate position of the film from the surface of the layer to the metal plate is denoted by $\Delta n_2$, and a value on the side in contact with the metal plate by $\Delta n_3$, then, there is a feature in that at least one of $\Delta n_1$ or $\Delta n_2$ is not smaller than 0.02, and $\Delta n_3$ is not larger than $\Delta n_1$ or $\Delta n_2$.

13. A laminate according to claim 1, wherein said polyester comprises (a) a dibasic acid, (b) a diol, and (c) at least one branching component selected from the group consisting of a trifunctional or a higher functional polybasic acid and a polyhydric alcohol, said branching component being contained in an amount of 0.05 to 3.0 mol % per said polyester.

14. A laminate comprising a metal base and a resin layer comprising a polyester, wherein said resin layer comprises a polyester composition comprising (I) a polyethylene terephthalate segment, (II) a polyester segment derived from a butylene glycol and an aromatic dibasic acid, and (III) a polyester segment derived from a butylene glycol and an aliphatic dibasic acid at a weight ratio I:II:III of 30–80:8–63:2–42 with the total amount as 100 parts by weight, and further comprises at least one kind of non-sulfur type antioxidant having a molecular weight of not smaller than 400 in an amount of 0.01 to 1.5 parts by weight per 100 parts by weight of the polyester composition, wherein said resin layer having a melt viscosity ratio (R) defined by the following formula (1), $$R = \eta_{12.2}/\eta_{1216} \quad (1)$$

wherein $\eta_{12.2}$ is a melt viscosity at an extrusion temperature of the polyester at a shearing rate of 12.2 sec$^{-1}$, and $\eta_{1216}$ is a melt viscosity at an extrusion temperature of the polyester at a shearing rate of 1216 sec$^{-1}$,
of not smaller than 2.0 at a melt extrusion temperature of the polyester, and having $\eta_{1216}$ of not smaller than 500 poises, and the difference between the density ($\rho$) of the polyester layer of the laminate after extrusion and the amorphous density ($\rho a$) is not larger than 0.05.

15. A laminate comprising a metal base and a plurality of resin layers comprising a polyester, wherein the surface resin layer in said plurality of resin layers comprises a polyester composition having a glass transition point of not lower than 70° C., and the underlying resin layer in said plurality of resin layers comprises a polyester composition comprising (I) a polyethylene terephthalate segment, (II) a polyester segment derived from a butylene glycol and an aromatic dibasic acid, and (III) a polyester segment derived from a butylene glycol and an aliphatic dibasic acid at a weight ratio I:II:III of 30–80:8–63:2–42 with the total amount as 100 parts by weight, and further comprises at least one kind of non-sulfur type antioxidant having a molecular weight of not smaller than 400 in an amount of 0.01 to 1.5 parts by weight per 100 parts by weight of the polyester composition, wherein said underlying resin layer having a melt viscosity ratio (R) defined by the following formula (1), $$R = \eta_{12.2}/\eta_{1216} \quad (1)$$

wherein $\eta_{12.2}$ is a melt viscosity at an extrusion temperature of the polyester at a shearing rate of 12.2 sec$^{-1}$, and $\eta_{1216}$ is a melt viscosity at an extrusion temperature of the polyester at a shearing rate of 1216 sec$^{-1}$,
of not smaller than 2.0 at a melt extrusion temperature of the polyester, and having $\eta_{1216}$ of not smaller than 500 poises, and the difference between the density ($\rho$) of the polyester layer of the laminate after extension and the amorphous density ($\rho a$) is not larger than 0.05.

16. A laminate according to claim 14 or 15, wherein said polyester composition is a blend of a polyester comprising a polyethylene terephthalate (I), a copolymerized polyester containing a polyester (II), and a polyester (III).

17. A laminate according to claim 16, wherein the polyester comprising of the polyethylene terephthalate segment (I) in the blend has an ester interchange ratio (E) as defined by the following formula (3), $$E = 100 \cdot [1 - \exp\{(Hu/R) \cdot (1/Tm0 - 1/Tm)\}] \quad (3)$$

wherein,

Hu: quantity of heat of fusion of crystalline polyester composed chiefly of an ethylene terephthalate unit, 9200 (J/mol), R: gas constant, 8.314 (J/(mol·K)), Tm: melting point (K) of the blend, Tm0: melting point (K) of the crystalline polyester composed chiefly of the ethylene terephthalate unit, of from 0.5 to 20%.

18. A laminate according to claim 16, wherein said blend has an intrinsic viscosity [η] of not smaller than 0.55.

* * * * *